US012589818B2

(12) United States Patent
Shirai et al.

(10) Patent No.: US 12,589,818 B2
(45) Date of Patent: Mar. 31, 2026

(54) RIDER-POSTURE CHANGING ASSEMBLY FOR HUMAN-POWERED VEHICLE

(71) Applicant: Shimano Inc., Osaka (JP)

(72) Inventors: Toyoto Shirai, Osaka (JP); Takeshi Kuroiwa, Osaka (JP)

(73) Assignee: Shimano Inc., Osaka (JP)

( * ) Notice: Subject to any disclaimer, the term of this patent is extended or adjusted under 35 U.S.C. 154(b) by 273 days.

(21) Appl. No.: 18/217,820

(22) Filed: Jul. 3, 2023

(65) Prior Publication Data

US 2025/0010932 A1 Jan. 9, 2025

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC .............................. B62J 2001/085; B62J 1/08
USPC ........................................ 297/215.13, 215.14
See application file for complete search history.

(56) References Cited

U.S. PATENT DOCUMENTS

| | | | |
|---|---|---|---|
| 8,016,349 | B2 | 9/2011 | Mouri et al. |
| 9,511,809 | B2 | 12/2016 | Kodama et al. |
| 9,540,063 | B1 | 1/2017 | Shirai |
| 10,040,499 | B2 | 8/2018 | Hara et al. |
| 10,358,180 | B2 | 7/2019 | Shipman et al. |
| 10,549,803 | B2 | 2/2020 | Shipman et al. |
| 10,618,589 | B2 | 4/2020 | Hara et al. |
| 10,829,173 | B2 | 11/2020 | Hara et al. |
| 11,001,323 | B2 | 5/2021 | Kurokawa |
| 11,021,204 | B2 | 6/2021 | Pelot et al. |
| 11,066,118 | B2 | 7/2021 | Katsuki et al. |
| 11,180,212 | B2 | 11/2021 | Shirai |
| 11,325,669 | B1 | 5/2022 | Sheng |
| 11,649,002 | B2 * | 5/2023 | Shipman .................... B62J 1/08 297/215.13 |
| 11,649,003 | B2 * | 5/2023 | Hara .................... B62J 45/4152 297/215.13 |
| 11,738,817 | B2 * | 8/2023 | Shipman .................. B62J 43/30 280/274 |
| 11,745,817 | B2 * | 9/2023 | Coaplen .................... B62J 1/08 297/215.14 |
| 2017/0043832 | A1 | 2/2017 | Tsai |

(Continued)

FOREIGN PATENT DOCUMENTS

DE        10 2021 107 870  A1      9/2022

*Primary Examiner* — Jose V Chen
(74) *Attorney, Agent, or Firm* — Spencer Fane, LLP

(57) ABSTRACT

A rider-posture changing assembly basically includes a first member, a second member and a state-changing structure. The first member has an actuator receiving part configured to interchangeably receive one of a mechanical actuator and an electric actuator at a time. The mechanical actuator and the electric actuator each has a connecting portion configured to engage with the actuator receiving part. The connecting portions of the mechanical actuator and the electric actuator are similar to each other. The first and second members are relatively movable in a longitudinal direction. The state-changing structure is configured to change the state of the rider-posture changing assembly between a first state and a second state. The first and second members are restricted from moving relative to each other in the first state. The first and second members are relatively movable in the longitudinal direction in the second state.

21 Claims, 30 Drawing Sheets

(56)     References Cited

U.S. PATENT DOCUMENTS

| 2017/0341692 | A1 | 11/2017 | Shirai |
| 2018/0127041 | A1 | 5/2018 | Tsai |
| 2018/0194418 | A1 | 7/2018 | Bowers |
| 2019/0002051 | A1 | 1/2019 | Shipman et al. |
| 2019/0061852 | A1* | 2/2019 | Shirai .................... B62K 19/36 |
| 2019/0351966 | A1* | 11/2019 | Shirai ........................ B62J 1/08 |
| 2021/0107588 | A1* | 4/2021 | Sakagawa ................ B62J 45/41 |
| 2023/0083520 | A1* | 3/2023 | Yuasa .................... B62M 9/123 |
| | | | 701/37 |
| 2023/0083770 | A1* | 3/2023 | Kurotobi ................. B62J 45/41 |
| | | | 701/2 |
| 2023/0085230 | A1* | 3/2023 | Idogaki ................. B62M 9/132 |
| | | | 474/70 |
| 2023/0089903 | A1* | 3/2023 | Sakagawa ............ B60L 3/0092 |
| | | | 701/51 |
| 2023/0234661 | A1* | 7/2023 | Holaday .................... B62J 1/08 |
| | | | 297/215.13 |

* cited by examiner

RIDER-POSTURE CHANGING ASSEMBLY FOR HUMAN-POWERED VEHICLE

BACKGROUND

Technical Field

This disclosure generally relates to a rider-posture changing assembly for a human-powered vehicle.

Background Information

When riding a human-powered vehicle such as a bicycle, a rider may adopt different riding postures according to various operating conditions. When the rider adopts a different riding posture, it may be desirable to adjust various components of the human-powered vehicle to support the rider's riding posture. Thus, some human-powered vehicles, in particular bicycles, have been provided with components that are adjustable to change a posture of a rider or user of the vehicle. For example, a rider's posture can be adjusted by changing the height of a vehicle seat with respect to a vehicle frame. Also, for example, the rider's posture can be adjusted by changing the height of a handlebar stem with respect to the vehicle frame. In recent years, some human-powered vehicles are provided with a height adjustable seatpost that can be adjusted while the vehicle is moving. Also, some human-powered vehicles are provided with an adjustable handlebar stem that can be adjusted while the vehicle is moving.

SUMMARY

Generally, the present disclosure is directed to various features of a rider-posture changing assembly for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a rider-posture changing assembly for a human-powered vehicle. The rider-posture changing assembly basically comprises a first member, a second member and a state-changing structure. The first member extends in a longitudinal direction. The first member has a first distal end and a first proximal end opposite to the first distal end. The first proximal end has an actuator receiving part configured to interchangeably receive one of a mechanical actuator and an electric actuator at a time. The mechanical actuator has a first connecting portion configured to engage with the actuator receiving part. The electric actuator has a second connecting portion configured to engage with the actuator receiving part. The second connecting portion is similar to the first connecting portion. The second member extends in the longitudinal direction. The first member and the second member are relatively movable in the longitudinal direction. The state-changing structure is operatively coupled to one of the mechanical actuator and the electric actuator. The state-changing structure is configured to change the state of the rider-posture changing assembly between a first state and a second state. The first member and the second member are restricted from moving relative to each other in the first state. The first member and the second member are relatively movable in the longitudinal direction in the second state.

With the rider-posture changing assembly according to the first aspect, a user can easily change between a mechanical actuator and the electric actuator.

In accordance with a second aspect of the present disclosure, a rider-posture changing assembly for a human-powered vehicle. The rider-posture changing assembly basically comprises a first member, a second member, an actuator and a state-changing structure. The first member extends in a longitudinal direction. The first member has a first distal end and a first proximal end opposite to the first distal end. The second member extends in the longitudinal direction. The first member and the second member are relatively movable in the longitudinal direction. The actuator is configured to move one of the first member and the second member relative to another of the first member and the second member. The actuator is configured to be selectively changeable between one of a mechanical actuator and an electric actuator. The state-changing structure is operatively connected to one of the mechanical actuator and the electric actuator. The state-changing structure is configured to change the state of the rider-posture changing assembly between a first state and a second state. The first member and the second member are restricted from moving relative to each other in the first state. The first member and the second member are relatively movable in the longitudinal direction in the second state. The state-changing structure is operated mechanically in a first coupling state where the mechanical actuator is coupled to the state-changing structure. The state-changing structure is operated electrically in a second coupling state where the electric actuator us coupled to the state-changing structure.

With the rider-posture changing assembly according to the second aspect, a user can easily change between a mechanical actuator and the electric actuator.

In accordance with a third aspect of the present disclosure, the rider-posture changing assembly according to the first aspect or the second aspect is configured so that the state-changing structure includes at least one of a compressible fluid, an incompressible fluid and a plurality of chambers. The state-changing structure is configured to vary the volume of the at least one of the compressible fluid and the incompressible fluid in the plurality of chambers in the second state.

With the rider-posture changing assembly according to the third aspect, the state-changing structure can reliably change the state of the rider-posture changing assembly between the first state and the second state.

In accordance with a fourth aspect of the present disclosure, the rider-posture changing assembly according to any one of the first aspect to the third aspect is configured so that the actuator is operatively coupled to a coupling rod. The coupling rod is configured to be moved in a movement direction relative to the one of the first member and the second member in the second state.

With the rider-posture changing assembly according to the fourth aspect, the actuator can easily actuate the state-changing structure to change the state of the rider-posture changing assembly between the first state and the second state.

In accordance with a fifth aspect of the present disclosure, the rider-posture changing assembly according to any one of the first aspect to the fourth aspect is configured so that the first proximal end includes a fastening portion provided to the actuator receiving part so as to configured to engage the actuator.

With the rider-posture changing assembly according to the fifth aspect, the actuator can be easily fastened to the actuator receiving part.

In accordance with a sixth aspect of the present disclosure, the rider-posture changing assembly according to the fifth aspect is configured so that the fastening portion is configured to engage one of the first and second connecting portions of the actuator.

With the rider-posture changing assembly according to the sixth aspect, the mechanical actuator or the electric actuator can be easily fastened to the fastening portion of the actuator receiving part.

In accordance with a seventh aspect of the present disclosure, the rider-posture changing assembly according to the sixth aspect is configured so that the fastening portion includes at least one of a thread, a magnetic portion, a recess, a ridge, a tab and a slot.

With the rider-posture changing assembly according to the seventh aspect, the mechanical actuator or the electric actuator can be reliably and easily fastened to the actuator receiving part.

In accordance with an eighth aspect of the present disclosure, the rider-posture changing assembly according to the sixth aspect is configured so that one of the first and second connecting portions of the actuator includes an additional fastening portion configured to engage the fastening portion of the actuator receiving part.

With the rider-posture changing assembly according to the eighth aspect, the additional fastening portion of the actuator can be easily fastened to the fastening portion of the actuator receiving part.

In accordance with a ninth aspect of the present disclosure, the rider-posture changing assembly according to the eighth aspect is configured so that the additional fastening portion includes at least one of a thread, a magnetic portion, a recess, a ridge, a tab and a slot.

With the rider-posture changing assembly according to the ninth aspect, the additional fastening portion of the mechanical actuator or the electric actuator can be reliably and easily fastened to the fastening portion of the actuator receiving part.

In accordance with a tenth aspect of the present disclosure, the rider-posture changing assembly according to any one of the first aspect to the ninth aspect is configured so that the actuator includes an adapter provided with one of the first and second connecting portions. The adapter is configured to provide proper installation of the actuator to the actuator receiving part.

With the rider-posture changing assembly according to the tenth aspect, it is possible to proper install the actuator to the actuator receiving part wherein one of the first and second connecting portions and the actuator receiving part has a different type of fastening connection.

In accordance with an eleventh aspect of the present disclosure, the rider-posture changing assembly according to the tenth aspect is configured so that the adapter is a separate member from the actuator and detachably attachable to the actuator.

With the rider-posture changing assembly according to the eleventh aspect, the adapter can be removed when the adapter is not needed.

In accordance with a twelfth aspect of the present disclosure, the rider-posture changing assembly according to any one of the first aspect to the eleventh aspect is configured so that the mechanical actuator includes an input member and an output member. The input member is configured to receive an operating force to move in a first direction. The output member is coupled to the input member to move in a second direction opposite to the first movement direction in accordance with a movement of the input member. The output member is configured to actuate the state-changing structure in the second state.

With the rider-posture changing assembly according to the twelfth aspect, it is possible to effectively convert the pulling force into a pushing force.

In accordance with a thirteenth aspect of the present disclosure, the rider-posture changing assembly according to the twelfth aspect is configured so that the input member is operatively coupled to an operating device. The input member is configured to receive the operating force in accordance with an operating amount of the operating device.

With the rider-posture changing assembly according to the thirteenth aspect, the input member can be easily operated in accordance with an operating amount of the operating device.

In accordance with a fourteenth aspect of the present disclosure, the rider-posture changing assembly according to the thirteenth aspect is configured so that the operating device includes one of a cable operating device and a hydraulic operating device.

With the rider-posture changing assembly according to the fourteenth aspect, the mechanical actuator can be reliably operated by using one of a cable operating device and a hydraulic operating device.

In accordance with a fifteenth aspect of the present disclosure, the rider-posture changing assembly according to any one of the first aspect to the eleventh aspect is configured so that the electric actuator includes a controller configured to control an actuating device configured to actuate the state-changing structure in accordance with an electrical signal from an operating device.

With the rider-posture changing assembly according to the fifteenth aspect, the electric actuator can be reliably operated by using an electric operating device.

In accordance with a sixteenth aspect of the present disclosure, the rider-posture changing assembly according to the fifteenth aspect is configured so that the actuating device includes at least one of a motor and a solenoid.

With the rider-posture changing assembly according to the sixteenth aspect, the state-changing structure can be reliably operated using at least one of a motor and a solenoid.

In accordance with a seventeenth aspect of the present disclosure, the rider-posture changing assembly according to the fifteenth aspect or the sixteenth aspect is configured so that the operating device is provided with a wireless communicator to wirelessly send the electrical signal to the electric actuator.

With the rider-posture changing assembly according to the seventeenth aspect, it is unnecessary to route an electrical wire between the electric actuator and the electric actuator.

In accordance with an eighteenth aspect of the present disclosure, the rider-posture changing assembly according to any one of the fifteenth aspect to the seventeenth aspect is configured so that the electric actuator is electrically connected to a power-supply. The power supply is provided to at least one of the first member, the second member, the electric actuator and a remote device.

With the rider-posture changing assembly according to the eighteenth aspect, electric power can be readily supplied to the electric actuator.

In accordance with a nineteenth aspect of the present disclosure, the rider-posture changing assembly according to the eighteenth aspect is configured so that the power supply includes at least one of a rechargeable power-supply and a non-rechargeable power-supply.

With the rider-posture changing assembly according to the nineteenth aspect, a user can select whether to use a rechargeable power-supply and a non-rechargeable power-supply.

In accordance with a twentieth aspect of the present disclosure, the rider-posture changing assembly according to any one of the first aspect to the nineteenth aspect further comprises a detector that is provided to at least one of the first member, the second member and the actuator. The detector is configured to detect position information of the second member relative to the first member. The detected position information is configured to be outputted as a signal to a remote device.

With the rider-posture changing assembly according to the twentieth aspect, the user can determine a position of the second member relative to the first member.

In accordance with a twenty-first aspect of the present disclosure, the rider-posture changing assembly according to the twentieth aspect is configured so that the detector includes at least one of a contact position detector and a non-contact position detector.

With the rider-posture changing assembly according to the twenty-first aspect, the position of the second member relative to the first member can be reliably detected by using at least one of a contact position detector and a non-contact position detector.

In accordance with a twenty-second aspect of the present disclosure, a rider-posture changing assembly conversion method comprises: providing an existing rider-posture changing assembly having a first member extending in a longitudinal direction, a second member relatively movable with the first member in the longitudinal direction, a state-changing structure selectively positioning the first member and the second member relative to each other, and a mechanically operated actuator mechanically connected to the state-changing structure; removing the mechanically operated actuator from the existing rider-posture changing assembly; and installing an electrically operated actuator to the existing rider-posture changing assembly using an existing connection of existing rider-posture changing assembly, the electrically operated actuator being configured to actuate the state-changing structure.

With the rider-posture changing assembly according to the twenty-second aspect, a user can easily change between a mechanical actuator and the electric actuator.

Also, other objects, features, aspects and advantages of the disclosed rider-posture changing assembly will become apparent to those skilled in the art from the following detailed description, which, taken in conjunction with the annexed drawings, discloses preferred embodiments of the rider-posture changing assembly.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
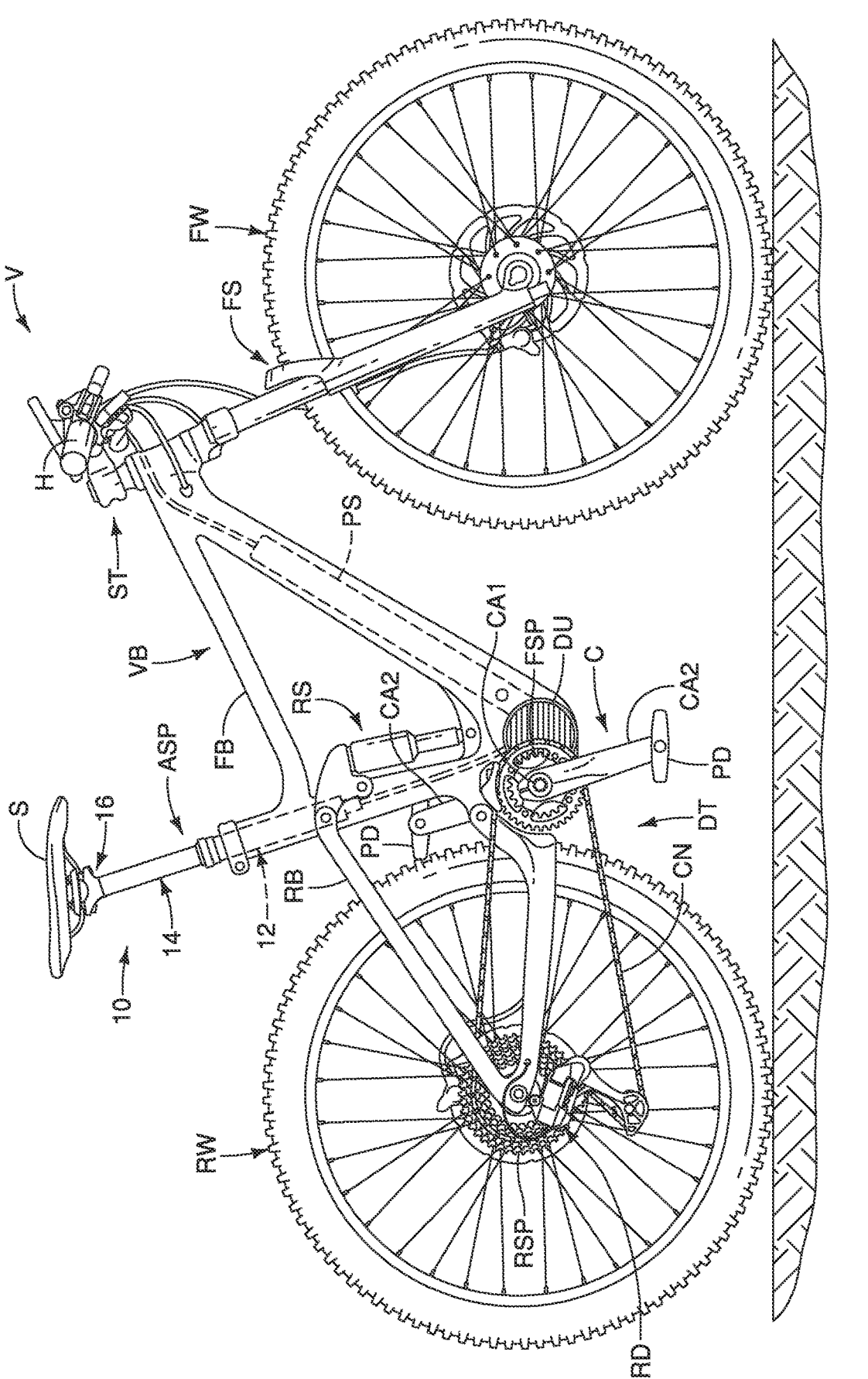
FIG. 1 is a side elevational view of a human-powered vehicle (e.g., a bicycle) equipped with a rider-posture changing assembly in accordance with a first illustrated embodiment in which the rider-posture changing assembly includes a height adjustable seatpost.

Referring initially to FIG. 1, an exemplary human-powered vehicle V is illustrated in accordance with an illustrated embodiment of the present disclosure. A rider-posture changing assembly 10 is provided for the human-powered vehicle V. The rider-posture changing assembly 10 is configured to change a posture of a rider while the rider is riding the human-powered vehicle V. In other words, by controlling the rider-posture changing assembly 10, the posture of a rider can be changed during riding (i.e., without stopping the human-powered vehicle V. The rider-posture changing assembly 10 can be manually controlled by the rider. Alternatively, the rider-posture changing assembly 10 can be automatically controlled based on one or more operating conditions of the human-powered vehicle V.

In the illustrated embodiment, for example, the human-powered vehicle V is an electric assist mountain bike (i.e., an off-road bicycle). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure. More specifically, in the embodiments described below, the human-powered vehicle V is an electric assist bicycle (E-bike).

As seen in FIG. 1, the human-powered vehicle V includes a vehicle body VB that is equipped with a plurality of electric components. As seen in FIG. 1, the vehicle body VB has a front frame body FB and a rear frame body RB (a swing arm) swingably mounted to a rear section of the front frame body FB such that the rear frame body RB can pivot with respect to the front frame body FB. A rear wheel RW is mounted to the rear frame body RB and a front wheel FW is mounted to the front frame body FB via a front suspension FS. A bicycle seat or saddle S is adjustably mounted to the front frame body FB by the rider-posture changing assembly 10 as discussed below. A rear suspension RS is provided between the front frame body FB and the rear frame body RB to control the movement of the rear frame body RB with respect to the front frame body FB. Namely, the rear suspension RS absorbs shock added to the rear wheel RW. The front suspension FS is pivotally mounted to a head tube of the front frame body FB. A handlebar H is mounted to an upper end of a steering column steerer tube of the front suspension FS. Specifically, a stem ST is mounted to the steering column steerer tube of the front suspension FS, and supports the handlebar H. The front suspension FS absorbs shock added to the front wheel FW. The front wheel FW is mounted to a lower end of the front suspension FS. The rear wheel RW is mounted to a rear end of the rear frame body RB.

The human-powered vehicle V further includes a drive-train DT and a drive unit DU operatively coupled to the drivetrain DT. The drive unit DU is also referred to as an electric assist unit. Here, for example, the drivetrain DT is a chain-drive type that includes a crank C, a front sprocket FSP, a plurality of rear sprockets RSP and a chain CN. The crank C includes a crank axle CA1 and a pair of crank arms CA2. The crank axle CA1 is rotatably supported to the front frame body FB via the electric assist unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type. Here, the human-powered vehicle V further includes a front derailleur FD that is attached to the front frame body FB for shifting the chain CN between the front sprockets FSP, and a rear derailleur RD that is attached to the rear frame body RB for shifting the chain CN between the rear sprockets RSP. The front derailleur FD and the rear derailleur RD are one type of gear changing device or transmission device for change a gear ratio of the drivetrain DT.

The front sprocket FSP is provided on the crank C to rotate integrally with the crank axle CA1. The rear sprockets RSP are provided on a hub HR of the rear wheel RW. The chain CN runs around the front sprocket FSP and the rear sprockets RSP. A human driving force is applied to the pedals PD by a rider or user of the human-powered vehicle V such that the driving force is transmitted via the front sprocket FSP, the chain CN and the rear sprockets RSP to the rear wheel RW.

The drive unit DU is actuated to assist in propulsion of the human-powered vehicle V in a conventional manner. The drive unit DU is actuated, for example, in accordance with a human driving force applied to the pedals PD. The drive unit DU includes an electric motor that is operatively coupled to the front sprocket FSP. The drive unit DU is actuated by electrical power that is supplied from a power supply PS. Here, the power supply PS is a main battery pack that supplies electrical power to several components. As in the illustrated embodiment, the power supply PS is integrated with the drive unit DU. The power supply PS extends from the drive unit DU into the downtube of the front frame body FB. The power supply PS can be detachably mounted to the drive unit DU. Preferably, the power supply PS includes at least one of a rechargeable power-supply and a non-rechargeable power-supply. Here, the power supply PS is configured as a rechargeable power-supply.

Preferably, the power supply PS houses at least one battery having one or more battery cells. The power supply PS can be removably disposed in the downtube of the rear frame body RB. Each of the battery cells of the power supply PS includes a rechargeable battery. The power supply PS supplies electric power to various components of the human-powered vehicle V in a conventional manner.

Figure 2:
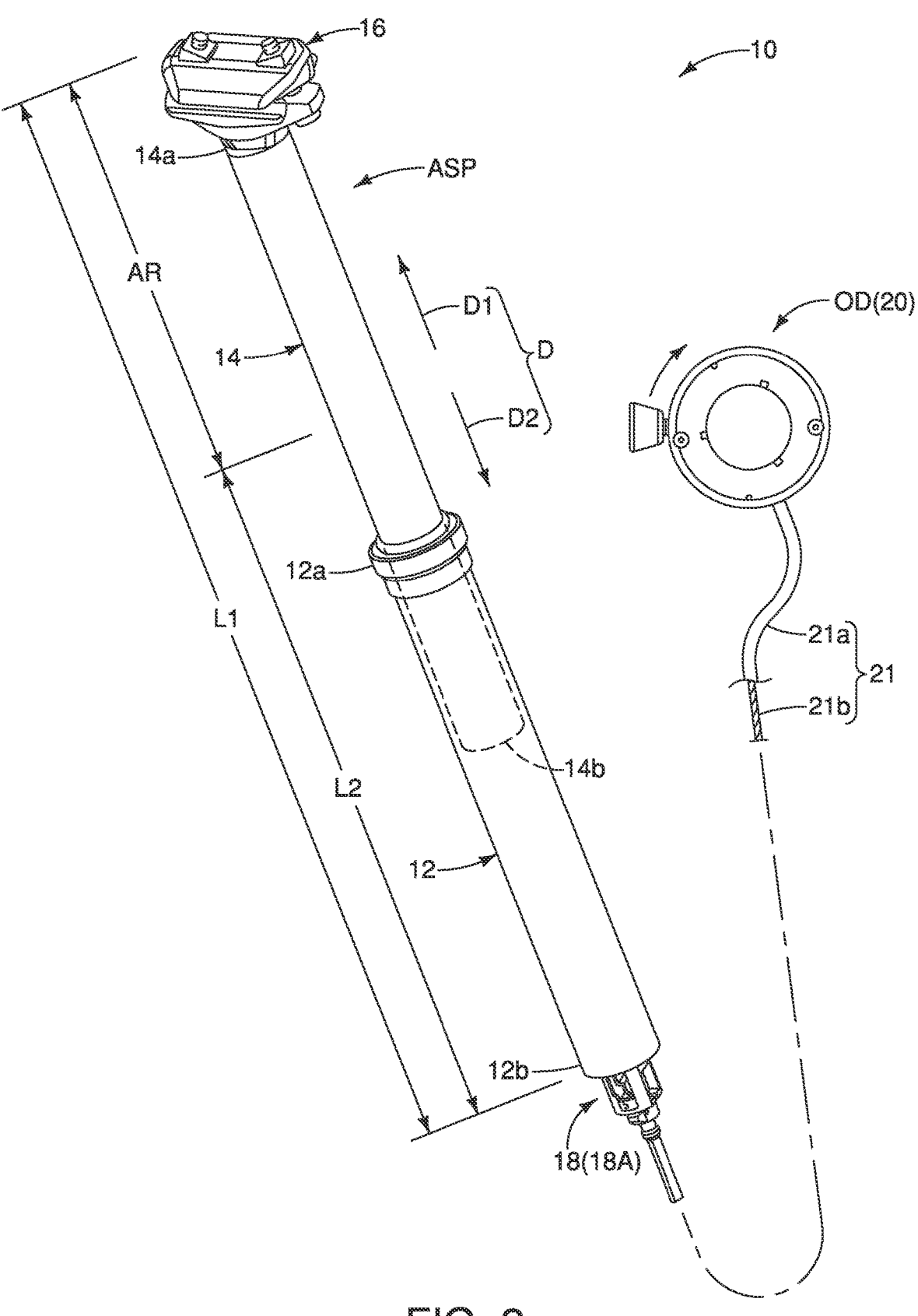
FIG. 2 is a perspective view of the rider-posture changing assembly illustrated in FIG. 1 in which the height adjustable seatpost has a mechanical actuator connected an operating device by a mechanical control cable.

In the first embodiment, as seen in FIG. 2, the rider-posture changing assembly 10 is a height adjustable seatpost assembly that includes a height adjustable seatpost ASP and an operating device OD. However, the rider-posture changing assembly 10 can be other devices such as a suspension or a handlebar stem. The height adjustable seatpost ASP is mounted in a seat tube of the front frame body FB. In particular, the upper end of the seat tube is provided with a longitudinal slit such that a clamping device adjusts the diameter of the upper end of the seat tube to squeeze the upper end of the seat tube around the height adjustable seatpost assembly 10. When the height adjustable seatpost ASP is mounted to the seat tube, the height adjustable seatpost ASP adjusts a seat height of the saddle S with respect to the front frame body FB. The operating device OD is remotely located from the height adjustable seatpost ASP. For example, the operating device OD is to the handlebar H. The operating device OD is configured so that a rider manually raise and/or lower the saddle S with respect to the front frame body FB. Alternatively, the height adjustable seatpost ASP can be modified to be automatically operated via an electronic controller. Preferably, the height adjustable seatpost ASP can be selectively operated both manually by a rider and automatically via an electronic controller.

Figure 3:
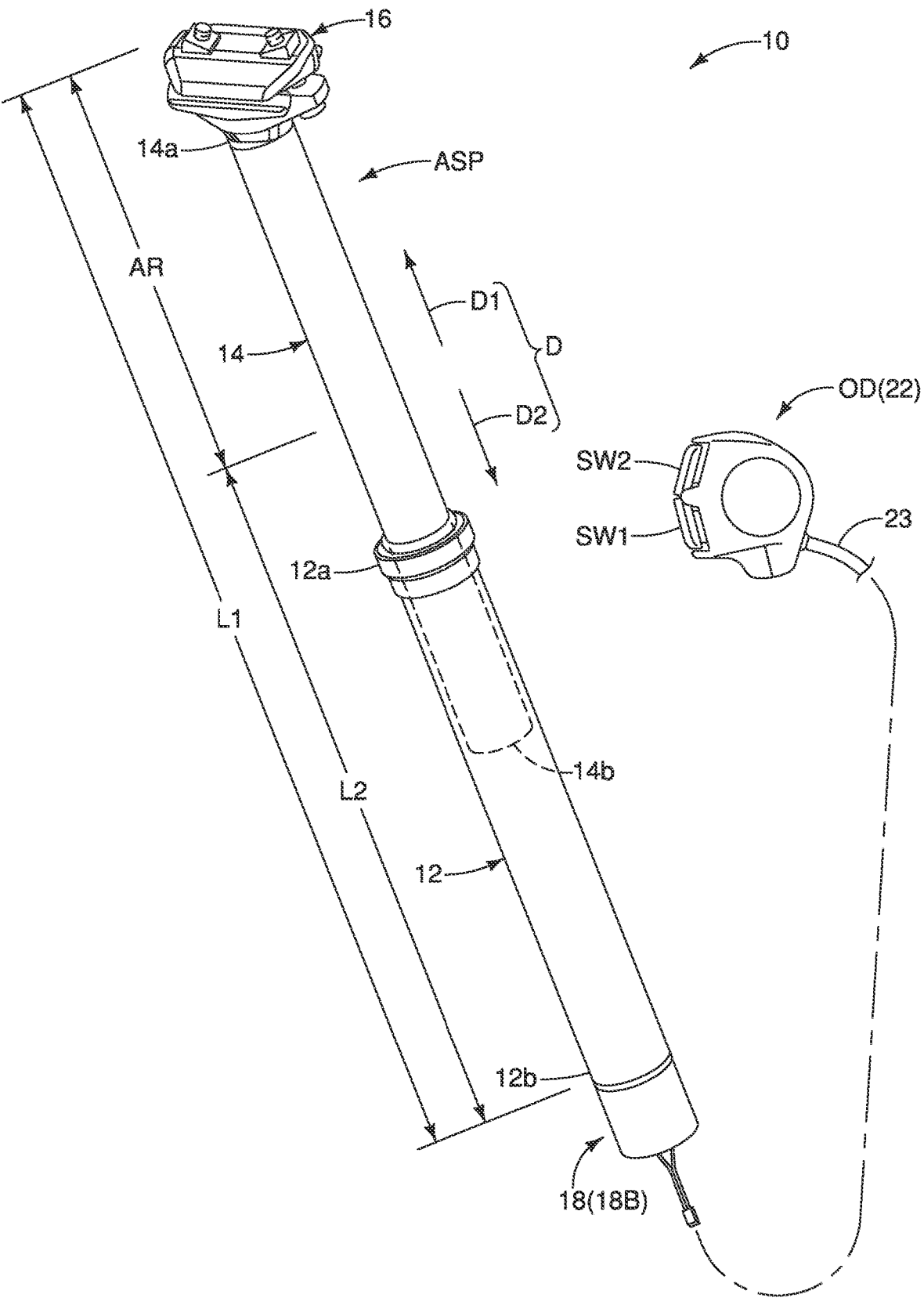
FIG. 3 is a perspective view of the rider-posture changing assembly illustrated in FIG. 1 in which the adjustable seatpost has an electric actuator electrically connected to an operating device by an electrical wire to carry out wired communication.
Figure 4:
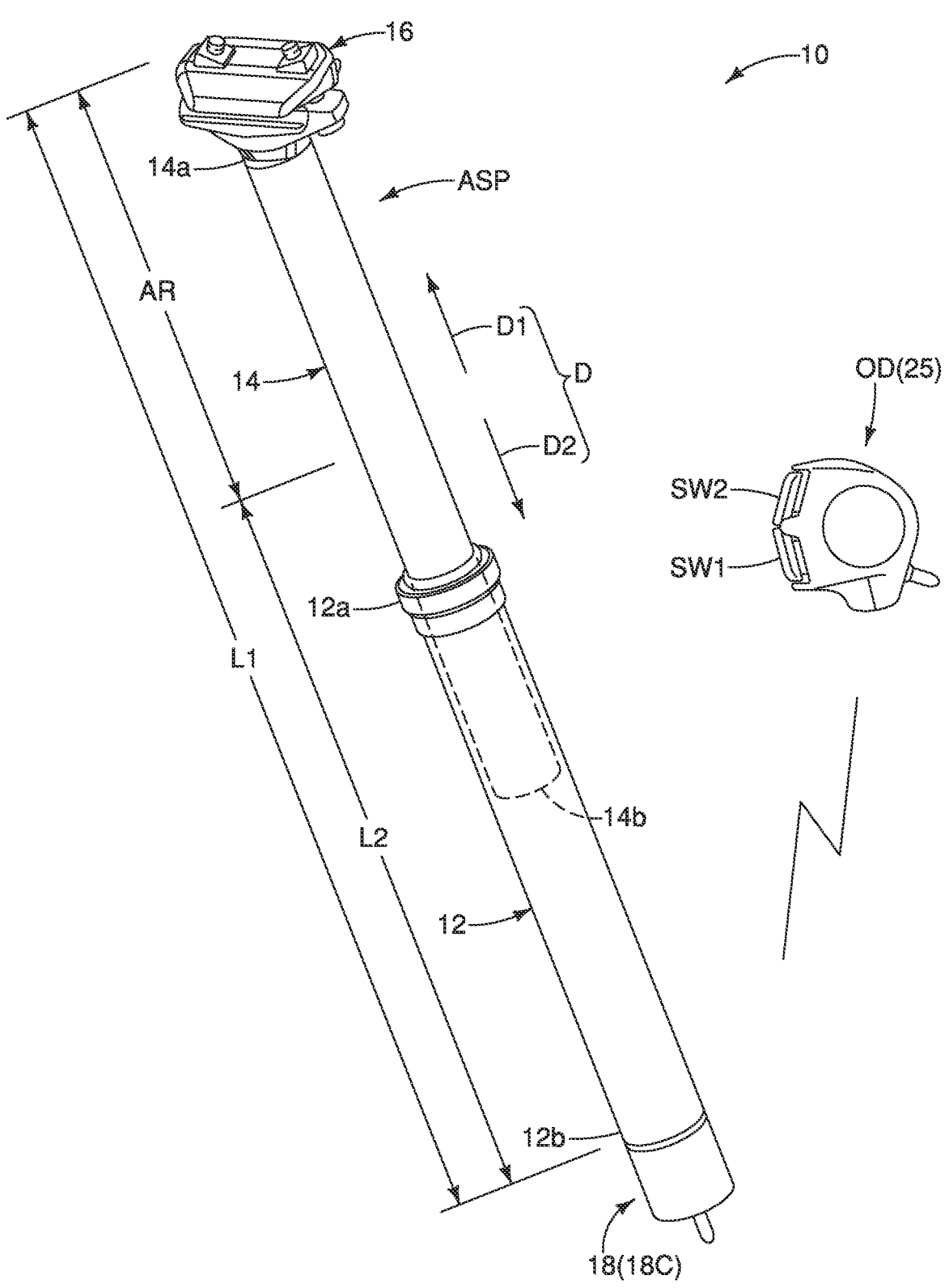
FIG. 4 is a perspective view of the rider-posture changing assembly illustrated in FIG. 1 in which the adjustable seatpost has an electric actuator and an operating device that are configured to carry out wireless communication.

Referring to FIGS. 2 to 4, the rider-posture changing assembly 10 basically comprises a first member 12 and a second member 14. The first member 12 and the second member 14 are relatively movable in a longitudinal direction D. Basically, the first member 12 is a first tube extending in the longitudinal direction D, and the second member 14 is a second tube extending in the longitudinal direction D. Here, the first member 12 is an outer tube and the second member 14 is an inner tube. In general, the first member 12 and the second member 14 are telescopically arranged, with an amount of insertion of the second member 14 into the first member 12 being adjustable between a plurality of positions (e.g., seat height positions). Specifically, the second member 14 moves relative to the first member 12 in a first movement direction D1 to increase an overall length of the height adjustable seatpost ASP. The second member 14 moves relative to the first member 12 in a second movement direction D2 to decrease an overall length of the height adjustable seatpost ASP. The first movement direction D1 and the second movement direction D2 are parallel to the center axis A.

As seen in FIGS. 2 to 4, the second member 14 is telescopically coupled to the first member 12 to vary a total length of the rider-posture changing assembly 10. The rider-posture changing assembly 10 has a maximum total length L1 and a minimum total length L2. The first member 12 has a first distal end 12a and a first proximal end 12b. The first proximal end 12b is opposite to the first distal end 12a. The second member 14 has a second distal end 14a and a second proximal end 14b. The second proximal end 14b is opposite to the second distal end 14a. In the first embodiment, the first distal end 12a is an upper end of the first member 12 in a mounting state where the rider-posture changing assembly 10 is mounted to the front frame body FB of the human-powered vehicle V. The second distal end 14a is an upper end of the second member 14 in the mounting state of the rider-posture changing assembly 10. The first distal end 12a of the first member 12 telescopically receives the second proximal end 14b of the second member 14. The first proximal end 12b of the first member 12 is configured to be detachably mounted to the front frame body FB of the human-powered vehicle V. The second proximal end 14b of the second member 14 is telescopically provided to the first distal end 12a of the first member 12 to move between a retracted position and an extended position. Here, the second member 14 can be set to a plurality of intermediate positions with respect to the first member 12. Here, the rider-posture changing assembly 10 further comprises a saddle mounting structure 16 to fixedly mount the saddle S to the second member 14.

As seen in FIGS. 2 to 5, the rider-posture changing assembly 10 further comprises an actuator 18. The actuator 18 is configured to move one of the first member 12 and the second member 14 relative to another of the first member 12 and the second member 14. In the first embodiment, the actuator 18 is attached to the first member 12. Alternatively, the actuator 18 can be attached to the second member 14 depending on the construction of the rider-posture changing assembly 10.

Basically, the first embodiment, the actuator 18 includes a mechanical actuator 18A, an electric actuator 18B or an electric actuator 18C. The mechanical actuator 18A is configured to mechanically receive a control signal from an operating device 20 via a control cable 21. For example, the control cable 21 is a Bowden cable that includes an outer casing 21a and inner wire 21b. The electric actuator 18B is configured to electrically receive a control signal from an operating device 22 via an electrical cable 23. For example, the electrical cable 23 is a power cable that is used to carry out power line communication (PLC). In this case, the operating device 22 includes a communicator 24 that is to carry out the power line communication (PLC). The electric actuator 18C is configured to wirelessly receive a control signal from an operating device 25 via a wireless communicator 26 of the operating device 25.

As explained below, the mechanical actuator 18A, the electric actuator 18B and the electric actuator 18C are each configured to be selectively attached to the first member 12. In other words, the actuator 18 is configured to be selectively changeable between one of the mechanical actuator 18A and the electric actuator 18B or 18C. In this way, a user can selectively install any one of the mechanical actuator 18A, the electric actuator 18B and the electric actuator 18C as needed and/or desired. Moreover, the user can selectively remove the one of the mechanical actuator 18A, the electric actuator 18B and the electric actuator 18C that is currently installed and replace it with any one of the mechanical actuator 18A, the electric actuator 18B and the electric actuator 18C that is currently not installed as needed and/or desired. The term "user" does not include only a rider, but also includes others such as a manufacturer, a bicycle repair person, etc. In other words, the term "user" is not limited to a rider, but rather includes anybody that may need and/or want to assembly, modify, repair or refurbish a rider-posture changing assembly to include either a mechanical actuator or an electric actuator. Thus, in using the rider-posture changing assembly 10 of the present disclosure, a user does not need to switch between a mechanical actuator or an electric actuator. Rather, a user can be a person initially assembling the rider-posture changing assembly 10 for the first time, and selecting the type of actuator to use.

Figure 9:
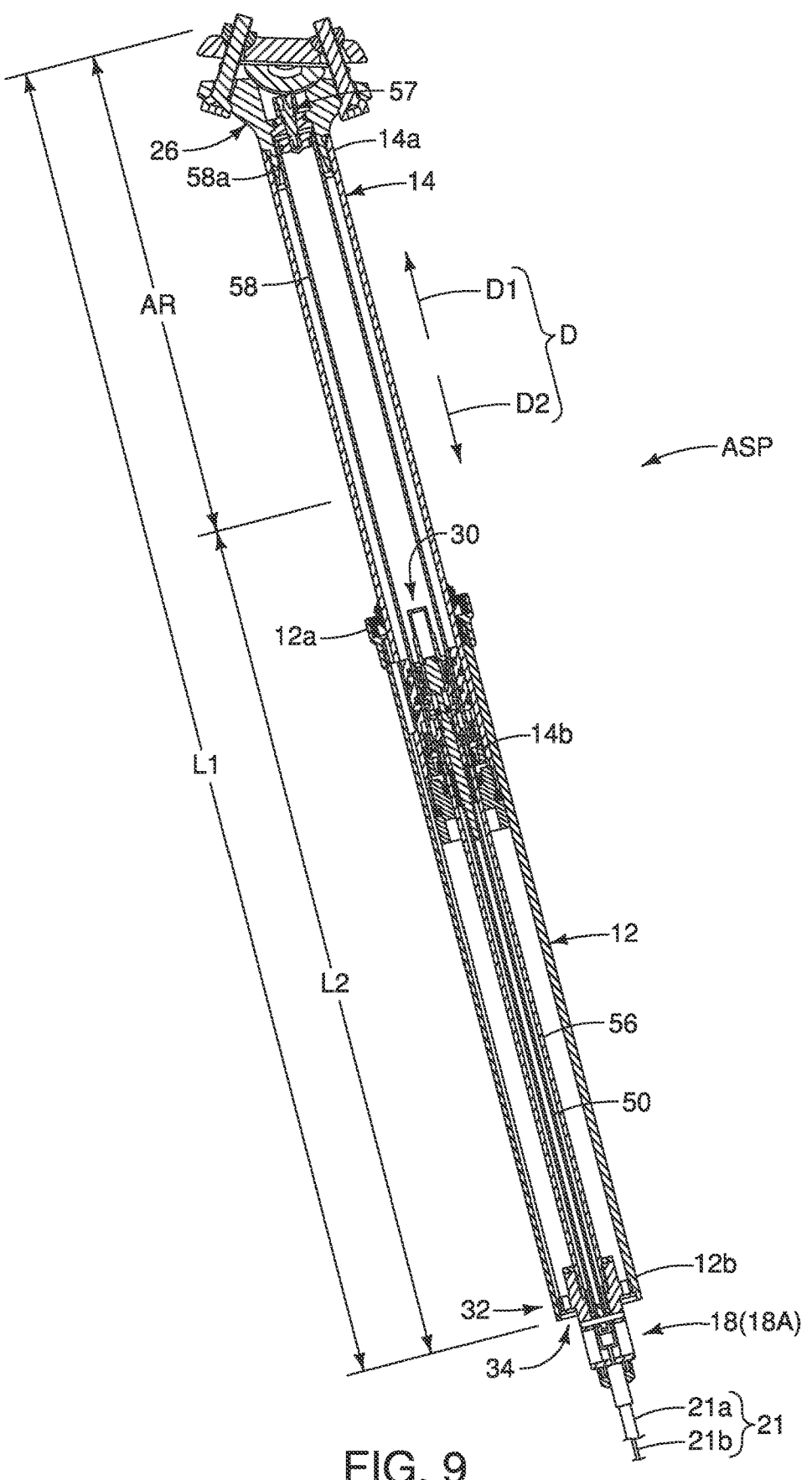
FIG. 9 is a longitudinal cross-sectional view of the height adjustable seatpost illustrated in FIG. 2 in which the valve is in a closed state.

As seen in FIG. 9, the rider-posture changing assembly 10 further comprises a state-changing structure 30. The state-changing structure 30 is configured to change a state of the rider-posture changing assembly 10. In the present embodiment, the state-changing structure 30 is configured to change the state of the rider-posture changing assembly 10 between a first state where the first member 12 and the second member 14 are restricted from moving relative to each other and a second state where the first member 12 and the second member 14 are relatively movable in a longitudinal direction D. However, the state of the rider-posture changing assembly 10 is not limited to the first state and the second state. In the first embodiment, the state-changing structure 30 is operated mechanically in a first coupling state where the mechanical actuator 18A is coupled to the state-changing structure 30. The state-changing structure 30 is operated electrically in a second coupling state where the electric actuator 18B or 18C is coupled to the state-changing structure 30. In any case, when the rider-posture changing assembly 10 is being used, the state-changing structure 30 is operatively coupled to one of the mechanical actuator 18A and the electric actuator 18B or 18C.

Accordingly, using the rider-posture changing assembly 10, a user can perform a rider-posture changing assembly conversion method in which the mechanical actuator 18A is replaced the electric actuator 18B or the electric actuator 18C. For example, in the first embodiment, the rider-posture changing assembly conversion method comprises providing the existing rider-posture changing assembly 10 having the first member 12 extending in the longitudinal direction D, the second member 14 relatively movable with the first member 12 in the longitudinal direction D, the state-changing structure 30 selectively positioning the first member 12 and the second member 14 relative to each other, and the mechanically operated actuator 18A mechanically connected to the state-changing structure 30. Then, the method further comprises removing the mechanically operated actuator 18A from the existing rider-posture changing assembly 10. Once the mechanically operated actuator 18A is removed, the method further comprises installing the electrically operated actuator 18B or 18C to the existing rider-posture changing assembly 10 using an existing connection of existing rider-posture changing assembly 10. The electrically operated actuator 18B or 18C is now configured to actuate the state-changing structure 30.

Alternatively, using the rider-posture changing assembly 10, a user can perform a rider-posture changing assembly conversion method in which the electric actuator 18B or the electric actuator 18C is replaced the mechanical actuator 18A. For example, in the first embodiment, the rider-posture changing assembly conversion method comprises providing the existing rider-posture changing assembly 10 having the first member 12, the second member 14, the state-changing structure 30, and the electric actuator 18B or the electric actuator 18C electrically connected to the state-changing structure 30. Then, the method further comprises removing the electric actuator 18B or the electric actuator 18C from the existing rider-posture changing assembly 10. Once the electric actuator 18B or the electric actuator 18C is removed, the method further comprises installing the mechanical actuator 18A to the existing rider-posture changing assembly 10 using an existing connection of existing rider-posture changing assembly 10. The mechanical actuator 18A is now configured to actuate the state-changing structure 30.

As seen in FIG. 9, the first member 12 extends in a longitudinal direction D. Likewise, the second member 14 extends in the longitudinal direction D. The first member 12 and the second member 14 are relatively movable in the longitudinal direction D. As mentioned above, the state-changing structure 30 is configured to change the state of the rider-posture changing assembly 10 between a first state and a second state. The first member 12 and the second member 14 are restricted from moving relative to each other in the first state. The first member 12 and the second member 14 are relatively movable in the longitudinal direction D in the second state. The first state can also be referred to as a locked state, and the second state can also be referred to as an adjustment state.

In the first or locked state, the second member 14 is fixed relative to the first member 12 to prevent movement in the axial direction. Specifically, in the first or locked state, the overall length of the height adjustable seatpost assembly 10 is maintained at an adjusted overall length. In the first or locked state, the first member 12 and the second member 14 are fixedly positioned relative to each other in the first movement direction D1 and the second movement direction D2. In the second or adjustment state, a position of the second member 14 is adjustable relative to the first member 12 in both the first movement direction D1 and the second movement direction D2. Specifically, in the second or adjustment state, the overall length of the height adjustable seatpost assembly 10 is continuously adjustable within an adjustment range AR. Namely, in the second or adjustment state, the positional relationship between the first member 12 and the second member 14 is continuously adjustable within the adjustment range AR. The second or adjustment state of the height adjustable seatpost ASP is not limited to this embodiment. The total length of the height adjustable seatpost ASP can be stepwise adjusted in the second or adjustment state. For example, the total length of the height adjustable seatpost ASP can be stepwise adjusted at each of different lengths. Thus, the state-changing structure 30 changes the state of the height adjustable seatpost assembly 10 between the locked state and the adjustment state. Specifically, the state-changing structure 30 changes the state of the first member 12 and the second member 14 between the locked or first state and the adjustment or second state.

Referring back to FIG. 5, the first proximal end 12*b* of the first member 12 is illustrated together with the mechanical actuator 18A, the electric actuator 18B and the electric actuator 18C. The first proximal end 12*b* has an actuator receiving part 32. The actuator receiving part 32 is configured to interchangeably receive one of the mechanical actuator 18A and the electric actuators 18B or 18C at a time. The mechanical actuator 18A has a first connecting portion 34. The first connecting portion 34 is configured to engage with the actuator receiving part 32. The electric actuator 18B has a second connecting portion 36. The second connecting portion 36 is configured to engage with the actuator receiving part 32. The second connecting portion 36 is similar to the first connecting portion 34. Also, the electric actuator 18C has a third connecting portion 38. The third connecting portion 38 is similar to the first connecting portion 34. In the first embodiment, the first connecting portion 34, the second connecting portion 36 and the third connecting portion 38 have the same connecting structure such that the first connecting portion 34, the second connecting portion 36 and the third connecting portion 38 are interchangeable connectable to the actuator receiving part 32.

Figure 5:
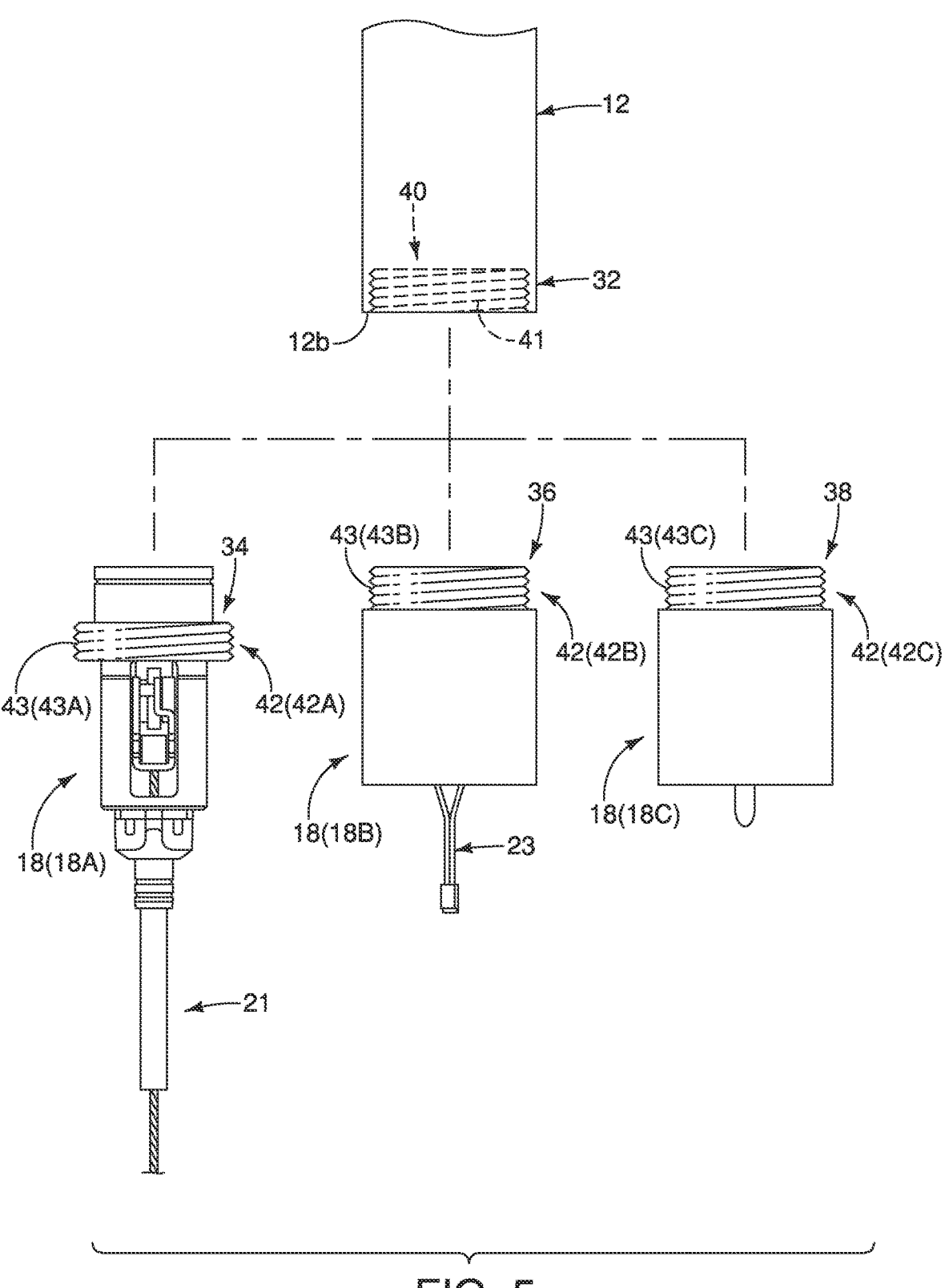
FIG. 5 is an elevational view of a bottom portion of the adjustable seatpost illustrated in FIG. 1 and the mechanical actuator of FIG. 2, the first electric actuator of FIG. 3 and the second electric actuator of FIG. 4 illustrating that the mechanical actuator, the first electric actuator and the second electric actuator can each be selectively connected to the bottom of the adjustable seatpost.

Here, as seen in FIG. 5, the first proximal end 12*b* includes a fastening portion 40. Specifically, the fastening portion 40 is provided to the actuator receiving part 32 so as to configured to engage the actuator 18. More specifically, the fastening portion 40 is configured to engage one of the first connecting portion 34 and the second connecting portion 36 of the actuator 18. Thus, one of the first connecting portion 34 and the second connecting portion 36 of the actuator 18 includes an additional fastening portion 42. The additional fastening portion 42 is configured to engage the fastening portion 40 of the actuator receiving part 32. Here, the fastening portion 40 is configured to selectively engage each of the first connecting portion 34 and the second connecting portion 36. Also, here, the fastening portion 40 is configured to selectively engage the third connecting portion. In other words, the fastening portion 40 is configured to selectively engage each of the first connecting portion 34, the second connecting portion 36 and the third connecting portion 38. In this way, a user can easily convert the rider-posture changing assembly 10 between a mechanically operated seatpost using the mechanical actuator 18A and an electrically operated seatpost using either the electric actuator 18B or the electric actuator 18C.

In accordance with the present disclosure, for example, the fastening portion 40 includes at least one of a thread, a magnetic portion, a recess, a ridge, a tab and a slot. Of course, the fastening portion 40 is not limited to these examples. Rather, the fastening portion 40 includes any type of connection that permits the actuator 18 to be attached and detached as needed/or desired. The connection area of the fastening portion 40 is preferably provided with a scaling material or scaling member to prevent the ingress of contaminants such as water, dirt, dust, sand, etc. In the first embodiment, as seen in FIG. 5, the fastening portion 40 at least includes a thread 41. In particular, the thread 41 is an internal thread (i.e., a female thread). In addition, the thread 41 can be magnetized such that the fastening portion 40 further includes a magnetic portion. Likewise, the additional fastening portion 42 includes at least one of a thread, a magnetic portion, a recess, a ridge, a tab and a slot. Basically, the fastening portion 40 engages the additional fastening portion 42 by either twisting the actuator 18 relative to the first member or by push-fitting the actuator 18 to the first member to provide proper installation. In the case where the fastening portion 40 engages the additional fastening portion 42 using magnetic portions, the fastening portion 40 can be engaged with the additional fastening portion 42 without either twisting the actuator 18 relative to the first member or by push-fitting the actuator 18 to the first member to provide proper installation.

In the first embodiment, the additional fastening portion 42 at least includes a thread 43. In particular, in the first embodiment, the thread 43 is an external thread (i.e., a male thread). In addition, the thread 43 can be magnetized such that the additional fastening portion 42 further includes a magnetic portion. In any case, the fastening portion 40 and the additional fastening portion 42 are complementary fastening portions that can mate together in a detachable and reattachable manner. Thus, in the first embodiment, the mechanical actuator 18A includes an additional fastening portion 42A having a thread 43A, the electric actuator 18B includes an additional fastening portion 42B having a thread 43B, and the electric actuator 18C includes an additional fastening portion 42C having a thread 43C. Here, each of the thread 43A, the thread 43B and the thread 43C is an external thread (i.e., a male thread) that is configured to be screwed into the thread 43.

Figure 6:
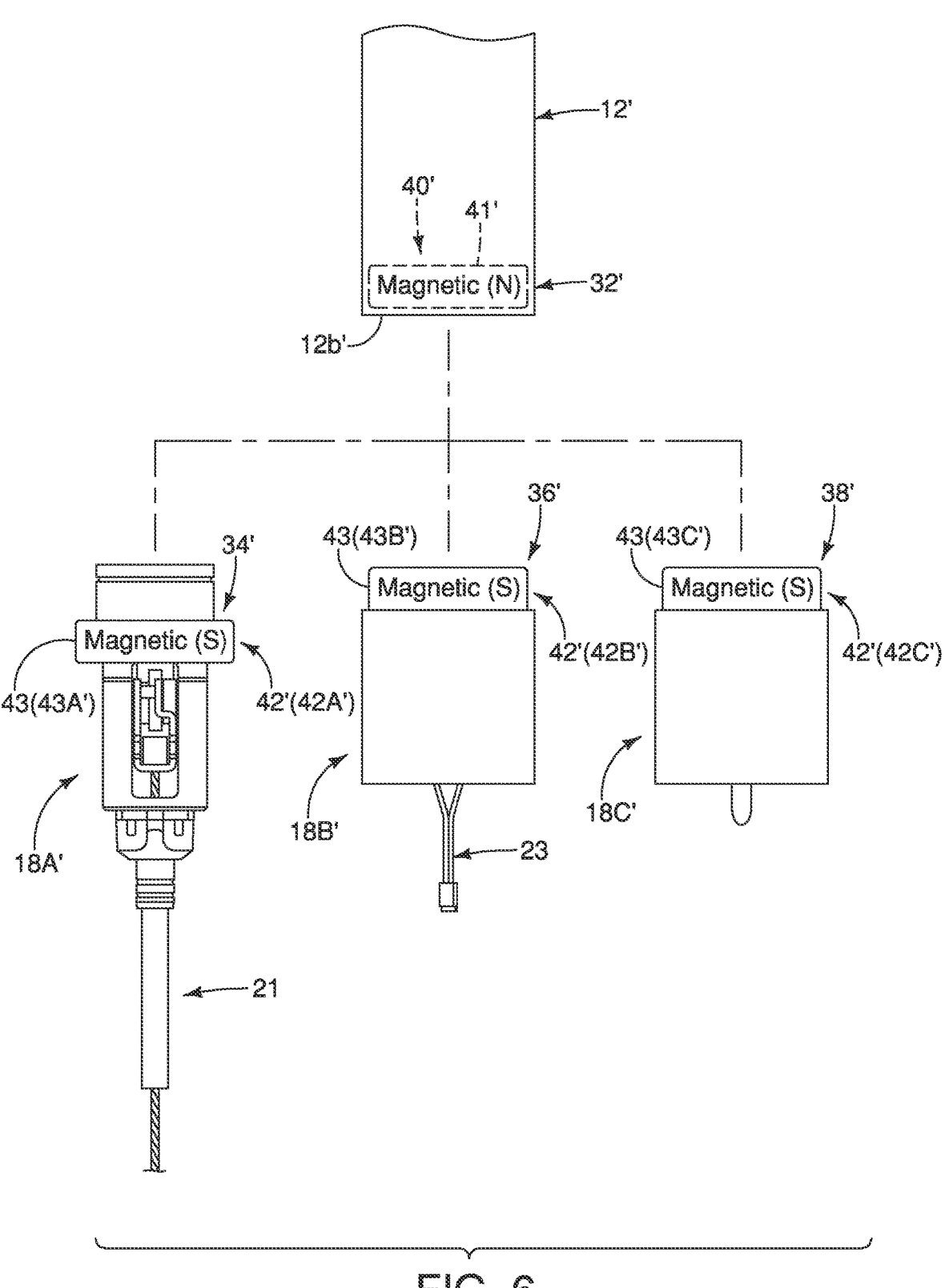
FIG. 6 is an elevational view of a bottom portion of an adjustable seatpost, a mechanical actuator, a first electric actuator and a second electric actuator in accordance with a first modification.

Alternatively, as seen in FIG. 6, a modified first member 12' is illustrated. The first member 12' is used with the second member 14 and the state-changing structure 30, which are discussed above and further discussed below. The first member 12' has a first proximal end 12*b*' including an actuator receiving part 32'. The actuator receiving part 32' includes a fastening portion 40'. The fastening portion 40' is configured to selectively engage each of a modified mechanical actuator 18A', a modified electric actuator 18B' and a modified electric actuator 18C'. In the modification, a first connecting portion 34' is provided to the mechanical actuator 18A', a second connecting portion 36' is provided to the electric actuator 18B', and a third connecting portion 38' is provided to the electric actuator 18B'. The first connecting portion 34', the second connecting portion 36' and the third connecting portion 38' have the same connecting structure such that the first connecting portion 34', the second connecting portion 36' and the third connecting portion 38' are interchangeable connectable to the actuator receiving part 32'.

The first member 12' is identical to the first member 12, except that the fastening portion 40' of the actuator receiving part 32' includes a magnetic portion 41' instead of the thread 41. Since the actuator receiving part 32' includes the magnetic portion 41' (e.g., a north pole magnet portion), the mechanical actuator 18A', the electric actuator 18B' and the electric actuator 18C' are each modified to mate with the magnetic portion 41' of the actuator receiving part 32'. In particular, the mechanical actuator 18A' is identical to the mechanical actuator 18A, except that the mechanical actuator 18A' includes an additional fastening portion 42A' having a magnetic portion 43A' (e.g., a south pole magnet portion) instead of the thread 43A. Similarly, the electric actuator 18B' is identical to the electric actuator 18B, except that the electric actuator 18B' includes an additional fastening portion 42B' having a magnetic portion 43B' (e.g., a south pole magnet portion) instead of the thread 43B. Also, similarly, the electric actuator 18C' is identical to the electric actuator 18C, except that the electric actuator 18C' includes an additional fastening portion 42C' having a magnetic portion 43C' (e.g., a south pole magnet portion) instead of the thread 43C. In this way, a user can easily convert this modified rider-posture changing assembly between a mechanically operated seatpost using the mechanical actuator 18A' and an electrically operated seatpost using either the electric actuator 18B' or the electric actuator 18C'.

Figure 7:
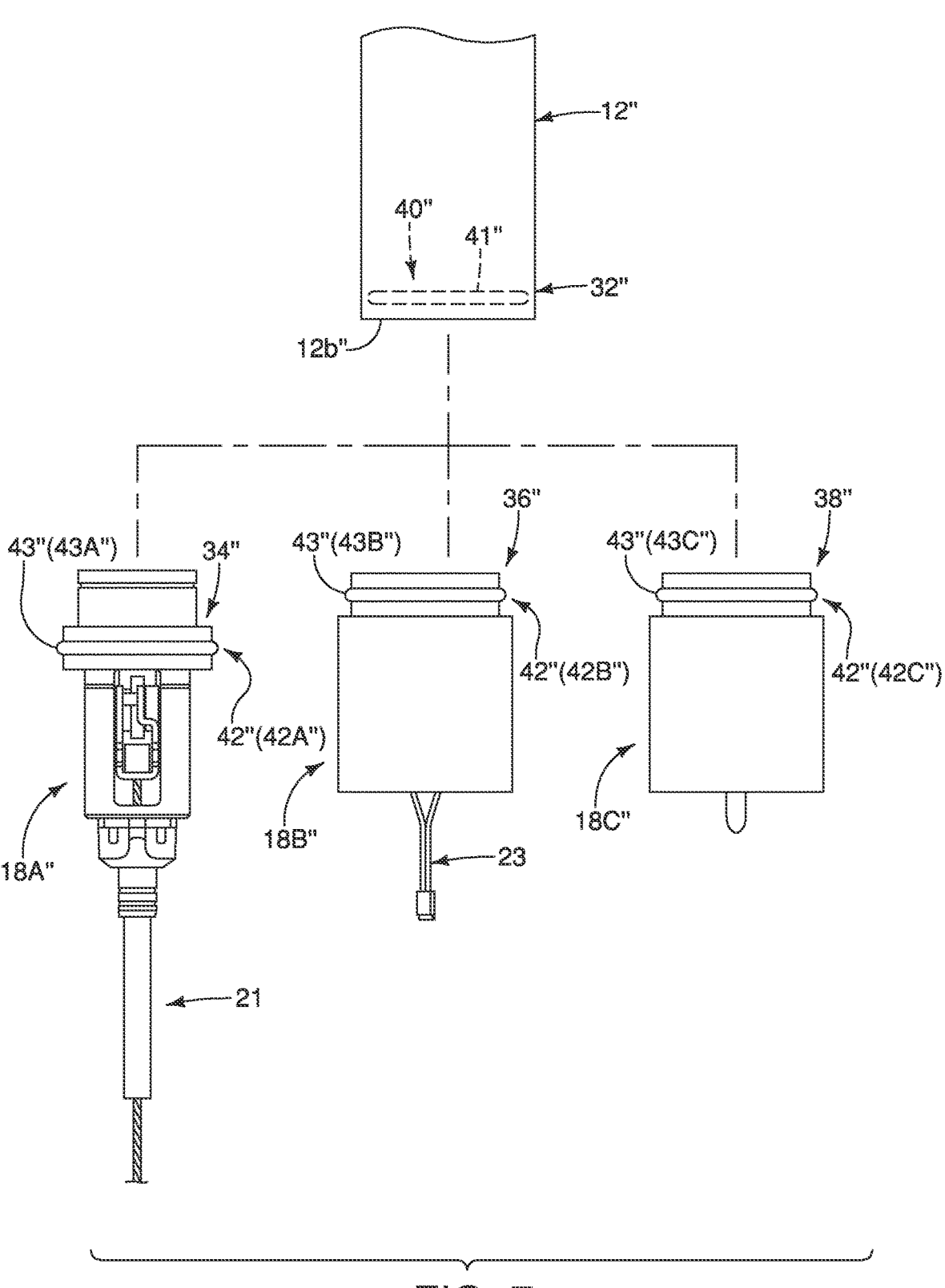
FIG. 7 is an elevational view of a bottom portion of an adjustable seatpost, a mechanical actuator, a first electric actuator and a second electric actuator in accordance with a second modification.

Alternatively, as seen in FIG. 7, a modified first member 12" is illustrated. The first member 12" is used with the second member 14 and the state-changing structure 30, which are discussed above and further discussed below. The first member 12" has a first proximal end 12b" including an actuator receiving part 32". The actuator receiving part 32" includes a fastening portion 40". The fastening portion 40" is configured to selectively engage each of a modified mechanical actuator 18A", a modified electric actuator 18B" and a modified electric actuator 18C". In this modification, a first connecting portion 34" is provided to the mechanical actuator 18A", a second connecting portion 36" is provided to the electric actuator 18B", and a third connecting portion 38" is provided to the electric actuator 18B". The first connecting portion 34", the second connecting portion 36" and the third connecting portion 38" have the same connecting structure such that the first connecting portion 34", the second connecting portion 36" and the third connecting portion 38" are interchangeable connectable to the actuator receiving part 32".

The first member 12" is identical to the first member 12, except that the fastening portion 40" of the actuator receiving part 32" includes an annular recess 41" instead of the thread 41. Since the actuator receiving part 32" includes the annular recess 41", the mechanical actuator 18A", the electric actuator 18B" and the electric actuator 18C" are each modified to mate with the annular recess 41" of the actuator receiving part 32". In particular, the mechanical actuator 18A" is identical to the mechanical actuator 18A, except that the mechanical actuator 18A" includes an additional fastening portion 42A" having an annular ridge 43A" instead of the thread 43A. Here, the annular ridge 43A" is configured to cooperate with the annular recess 41" to form a snap-fit connection therebetween. Similarly, the electric actuator 18B" is identical to the electric actuator 18B, except that the electric actuator 18B' includes an additional fastening portion 42B" having an annular ridge 43B" instead of the thread 43B. Here, the annular ridge 43B" is configured to cooperate with the annular recess 41" to form a snap-fit connection therebetween. Also, similarly, the electric actuator 18C" is identical to the electric actuator 18C, except that the electric actuator 18C' includes an additional fastening portion 42C" having an annular ridge 43C" instead of the thread 43C. Here, the annular ridge 43C" is configured to cooperate with the annular recess 41" to form a snap-fit connection therebetween. In this way, a user can easily convert this modified rider-posture changing assembly between a mechanically operated seatpost using the mechanical actuator 18A" and an electrically operated seatpost using either the electric actuator 18B" or the electric actuator 18C".

Figure 8:
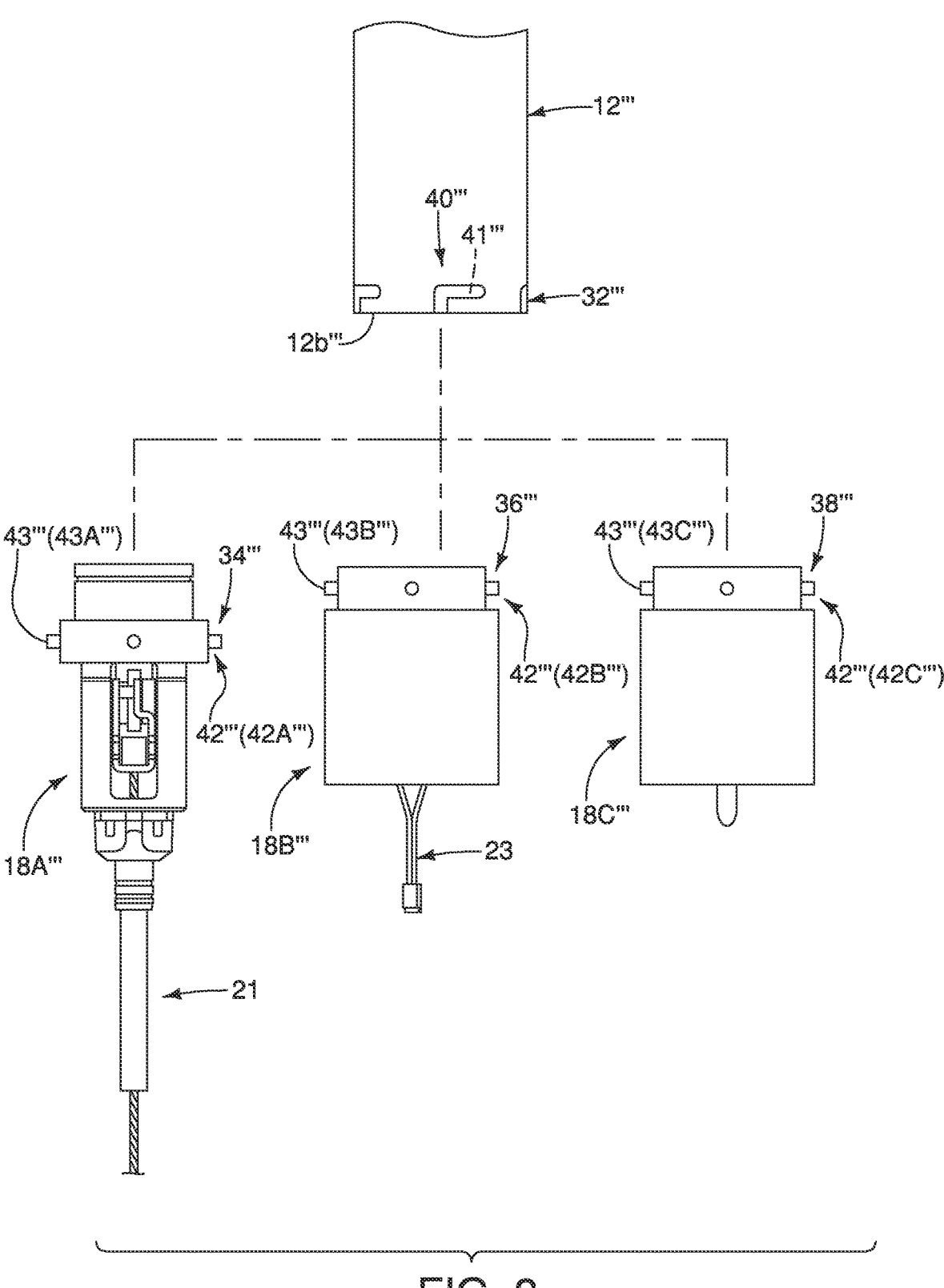
FIG. 8 is an elevational view of a bottom portion of an adjustable seatpost, a mechanical actuator, a first electric actuator and a second electric actuator in accordance with a third modification.

Alternatively, as seen in FIG. 8, a modified first member 12''' is illustrated. The first member 12''' is used with the second member 14 and the state-changing structure 30, which are discussed above and further discussed below. The first member 12''' has a first proximal end 12b''' including an actuator receiving part 32'''. The actuator receiving part 32''' includes a fastening portion 40'''. The fastening portion 40''' is configured to selectively engage each of a modified mechanical actuator 18A''', a modified electric actuator 18B''' and a modified electric actuator 18C'''. In this modification, a first connecting portion 34''' is provided to the mechanical actuator 18A''', a second connecting portion 36''' is provided to the electric actuator 18B''', and a third connecting portion 38''' is provided to the electric actuator 18B'''. The first connecting portion 34''', the second connecting portion 36''' and the third connecting portion 38''' have the same connecting structure such that the first connecting portion 34''', the second connecting portion 36''' and the third connecting portion 38''' are interchangeable connectable to the actuator receiving part 32'''.

The first member 12''' is identical to the first member 12, except that the fastening portion 40''' of the actuator receiving part 32''' includes at least one tab 41''' instead of the thread 41. Here, the actuator receiving part 32''' includes a plurality of the tab 41'''. Since the actuator receiving part 32' includes the tab 41''', the mechanical actuator 18A''', the electric actuator 18B''' and the electric actuator 18C''' are each modified to mate with the tab 41''' of the actuator receiving part 32'''. In particular, the mechanical actuator 18A''' is identical to the mechanical actuator 18A, except that the mechanical actuator 18A''' includes an additional fastening portion 42A''' having at least one slot 43A''' instead of the thread 43A. Preferably, the additional fastening portion 42A''' has a plurality of the slots 43A''' having a sideway L-shape. Also, preferably, the total number of the tabs 41''' is equal to the total number of the slots 43A'''. Here, the slots 43A''' are configured to cooperate with the tabs 41''' to form a bayonet connection therebetween. Similarly, the electric actuator 18B''' is identical to the electric actuator 18B, except that the electric actuator 18B' includes an additional fastening portion 42B''' having at least one slot 43B''' instead of the thread 43B. Preferably, the additional fastening portion 42A''' has a plurality of the slots 43B''' having a sideway L-shape. Also, preferably, the total number of the tabs 41''' is equal to the total number of the slots 43B'''. Here, the slots 43B''' are configured to cooperate with the tabs 41''' to form a bayonet connection therebetween. Also, similarly, the electric actuator 18C''' is identical to the electric actuator 18C, except that the electric actuator 18C' includes an additional fastening portion 42C''' having at least one slot 43C''' instead of the thread 43C. Preferably, the additional fastening portion 42C''' has a plurality of the slots 43C''' having a sideway L-shape. Also, preferably, the total number of the tabs 41''' is equal to the total number of the slots 43C'''. Here, the slots 43C''' are configured to cooperate with the tabs 41''' to form a bayonet connection therebetween. In this way, a user can easily convert this modified rider-posture changing assembly between a mechanically operated seatpost using the mechanical actuator 18A''' and an electrically operated seatpost using either the electric actuator 18B''' or the electric actuator 18C'''.

Referring now to FIGS. 9 to 12, the state-changing structure 30 will now be discussed in more detail. Basically, in the first embodiment, as explained below, the state-changing structure 30 includes at least one of a compressible fluid, an incompressible fluid and a plurality of chambers, the state-changing structure 30 is configured to vary volume of the at least one of the compressible fluid and the incompressible fluid in the plurality of chambers in the second state. In particular, in the first embodiment, the state-changing structure 30 includes a hydraulic structure 46 having a valve 48. The hydraulic structure 46 is a fluid flow control structure that is operated by the actuator 18 (e.g., the mechanical actuator 18A, the electric actuator 18B or the electric actuator 18C) either manually using the operating device OD (e.g., one of the operating devices 20, 22 or 24) or automatically. However, the state-changing structure 30 is not limited to the hydraulic structure 46 of the illustrated embodiment. For example, the state-changing structure 30 can be replaced with an air spring only type of state-changing structure or another hydraulic type of state-changing structure.

The valve 48 is operatively coupled to the actuator 18 (e.g., the mechanical actuator 18A, the electric actuator 18B or the electric actuator 18C) by a coupling rod 50. The basic construction of the hydraulic structure 46 is known in the human powered vehicle field. For example, a similar construction is disclosed in U.S. Pat. No. 11,180,212 (assigned to Shimano). Basically, the valve 48 includes a valve body 48A and a valve seat 48B. The position of the valve body 48A is continuously adjustable relative to the valve seat 48B between the closed position and the open position. Here, the valve 48 also includes a biasing element 48C for biasing the valve body 48A towards the valve seat 48B. Thus, the biasing element 48C is configured to bias the valve body 48A towards the closed position. Here, the biasing element 48C is a coil compression spring that is disposed around the valve body 48A.

As shown in FIG. 9, the actuator 18 is operatively coupled to the coupling rod 50. The coupling rod 50 is configured to be moved in a movement direction relative to the one of the first member 12 and the second member 14 in the second state. In particular, the coupling rod 50 is configured to be moved in one of the first movement direction D1 or the second movement direction D2 relative to the one of the first member 12 and the second member 14 in the second state in accordance with an operation of the actuator 18. The actuator 18 is at least partially provided to at least one of the first member 12 and the second member 14. In the present embodiment, the actuator 18 is entirely provided in the first member 12. However, the actuator 18 can be partially provided to at least one of the first member 12 and the second member 14 if needed and/or desired.

Here, the state-changing structure 30 includes a first hydraulic chamber 51, a second hydraulic chamber 52 and a third hydraulic chamber 53. Here, in the illustrated embodiment, the state-changing structure 30 further includes a fourth hydraulic chamber 54. The first hydraulic chamber 51 and the second hydraulic chamber 52 include an incompressible fluid FL1 (shown as a non-shaded area for the sake of illustration). Specifically, the incompressible fluid FL1 is filled in each of the first hydraulic chamber 51 and the second hydraulic chamber 52. For example, the incompressible fluid FL1 can be a hydraulic oil or any other suitable liquid. The first hydraulic chamber 51 is arranged downward from the second hydraulic chamber 52 and on a radially outside of the second hydraulic chamber 52. In this embodiment, the first hydraulic chamber 51 is filled with oil as the incompressible fluid FL1. The second hydraulic chamber 52 is configured to be disposed closer to the second distal end 14a of the second member 14 than the first hydraulic chamber 51. The second hydraulic chamber 52 is arranged outside the third hydraulic chamber 53, for example, on the upper side of the third hydraulic chamber 53.

The valve 48 is supported by the first member 12 via a support rod 56. Thus, the valve body 48A is movable relative to the support rod 56 and the first member 12 in the axial direction. The support rod 56 is disposed at the second proximal end 14b of the second member 14, and contacts the actuator 18. The support rod 56 is a hollow tube that is centered on the center axis A. The coupling rod 50 is movably disposed in the support rod 56.

Here, the valve 48 also includes a valve seat support 48D that is attached to the upper end of the support rod 56. The valve seat 48B is coupled to the valve seat support 48D, while the valve body 48A is movably disposed inside the support rod 56. The valve body 48A is connected to the actuator 18 by a coupling rod 50. The coupling rod 50 receives the lower end of the valve body 48A such that axial movement of the coupling rod 50 is transmitted to the valve body 48A. In this way, the valve body 48A is moved in the axial direction by the operation of the actuator 18. In other words, the actuator 18 is configured to move the valve body 48A to change the valve state from one of the closed state and the open state to the other of the closed state and the open state. In particular, the coupling rod 50 is attached to the valve body 48A for moving the valve body 48A relative to the valve seat 48B in the axial direction in response to movement of the actuator 18 by the operating device OD (e.g., one of the operating devices 20, 22 or 24). While the coupling rod 50 is illustrated as being hollow, it will be apparent from this disclosure that the coupling rod 50 does not need to be hollow, and can be modified to be a solid rod as needed and/or desired.

Basically, the third hydraulic chamber 53 is configured to expand as the valve body 48A is moved toward the valve seat 48B in the second movement direction D2, and is configured to shrink as the valve body 48A is moved away from the valve seat 48B in the first movement direction D1. The third hydraulic chamber 53 includes a compressible fluid FL2 (shown as dots). The third hydraulic chamber 53 is arranged between the first hydraulic chamber 51 and the second hydraulic chamber 52 in the axial direction. In this embodiment, for example, the compressible fluid FL2 can be air or any other suitable gas. Thus, the third hydraulic chamber 53 can be filled with air as the compressible fluid FL2.

Basically, the third hydraulic chamber 53 is configured to expand as the valve body 48A is moved toward the valve seat 48B in the second movement direction D2, and is configured to shrink as the valve body 48A is moved away from the valve seat 48B in the first movement direction D1. The third hydraulic chamber 53 includes a compressible fluid FL2 (shown as dots). The third hydraulic chamber 53 is arranged between the first hydraulic chamber 51 and the second hydraulic chamber 52 in the axial direction. In this embodiment, for example, the compressible fluid FL2 can be air or any other suitable gas. Thus, the third hydraulic chamber 53 can be filled with air as the compressible fluid FL2.

The fourth hydraulic chamber 54 is arranged on upper side of the first hydraulic chamber 51. The fourth hydraulic chamber 54 is arranged on radially outside of the second hydraulic chamber 52. Here, in the illustrated embodiment, the fourth hydraulic chamber 54 has a compressible fluid FL3 (shown as dots). For example, the compressible fluid FL3 can be air or any other suitable gas. In this embodiment, the compressible fluid such as air or gas is filled in the fourth hydraulic chamber 54. More specifically, the height adjustable seatpost ASP is provided with an air filling valve 57. There, the air filling valve 57 is provided in the saddle mounting structure 16.

As shown in FIGS. 9 to 15, the state-changing structure 30 further comprises an inner tube 58 that is coaxially disposed inside the second member 14. As seen in FIG. 9, the inner tube 58 has an upper end 58a that is coupled to the bottom of the air filling valve 57. The valve 48 is partially disposed in a lower end 58b of the inner tube 58. The support rod 56 is disposed at the lower end 58b of the inner tube 58. The fourth hydraulic chamber 54 is defined between the second member 14 and the inner tube 58 with the air filling valve 57 in fluid communication with the fourth hydraulic chamber 54 for supplying the compressible fluid FL3 therein.

Figure 11:
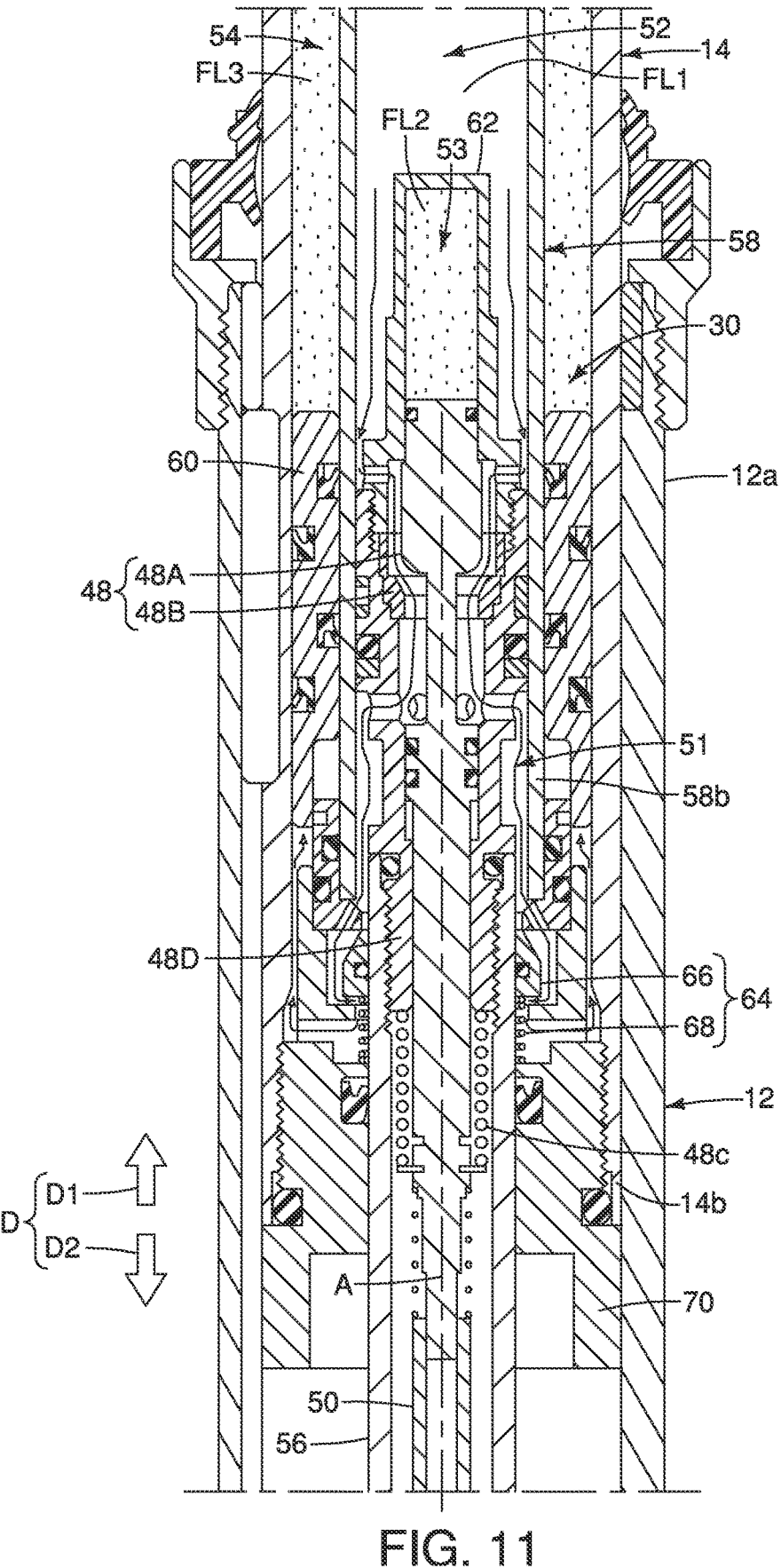
FIG. 11 is a longitudinal cross-sectional view of a middle portion of the height adjustable seatpost illustrated in FIG. 9 in which the valve is in an open state.
Figure 12:
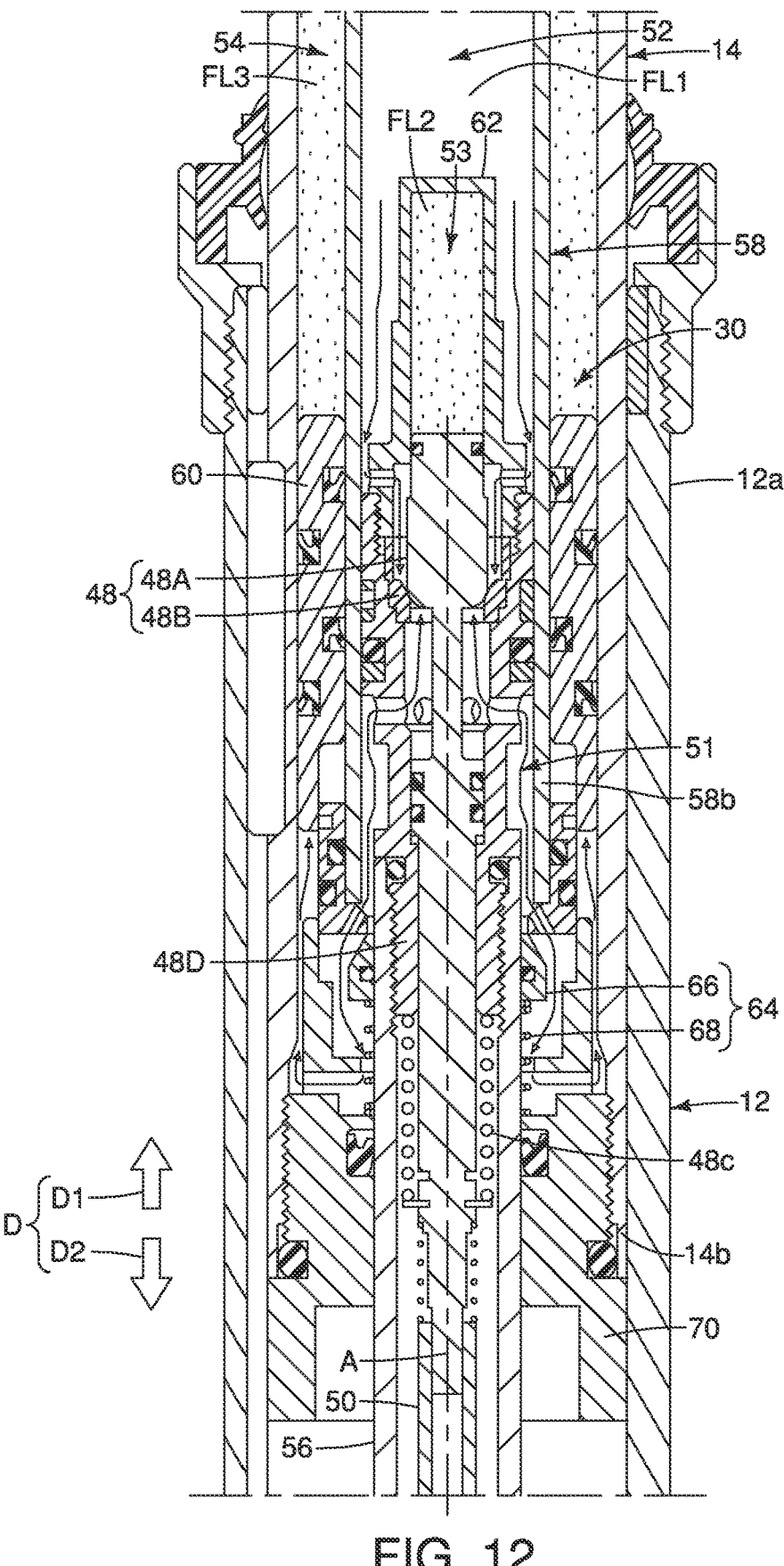
FIG. 12 is a longitudinal cross-sectional view of the middle portion of the height adjustable seatpost illustrated in FIG. 11, but in which the second member has moved downwardly with respect to the first member while the valve is in the open state.
Figure 13:
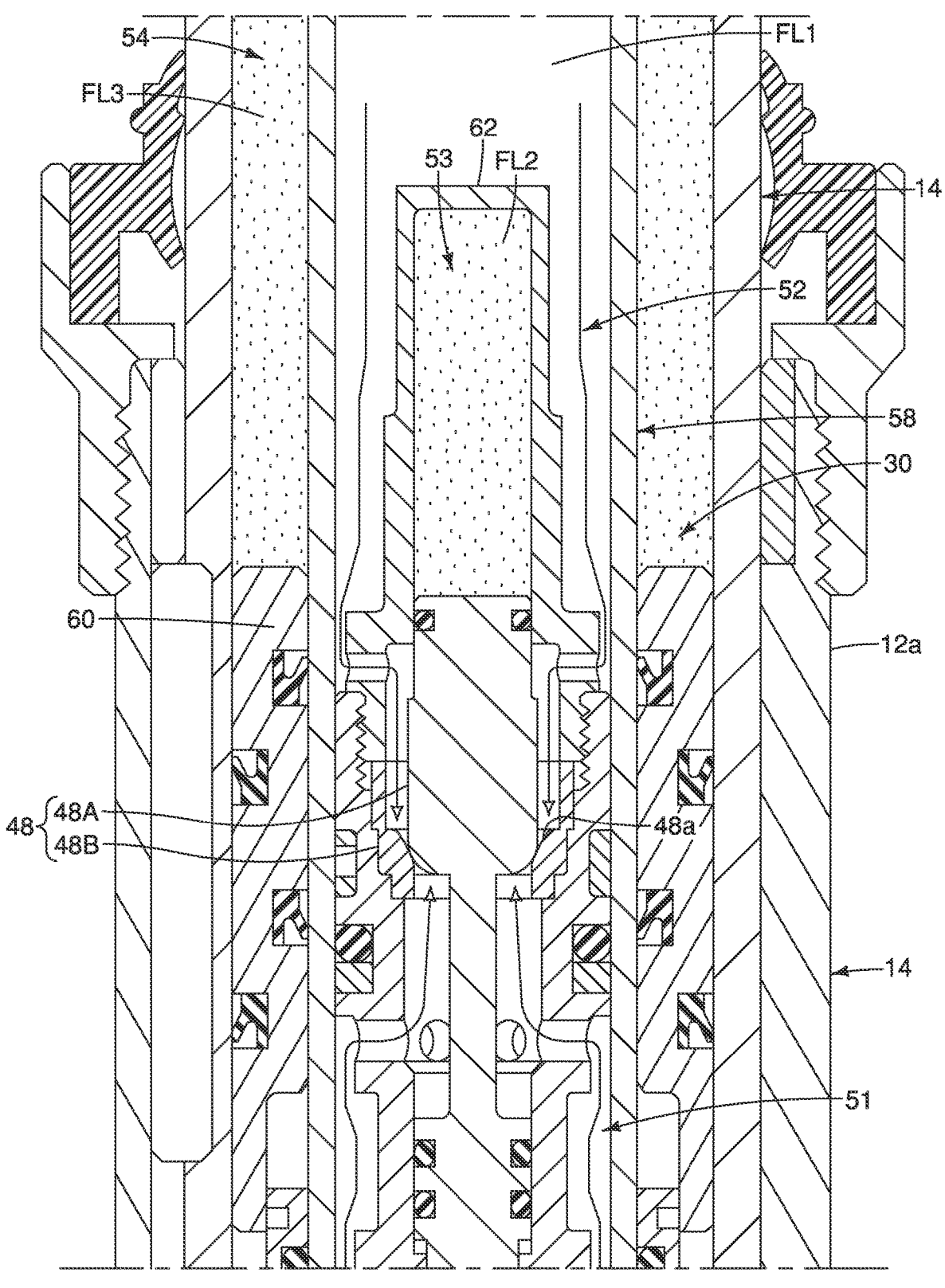
FIG. 13 is an enlarged longitudinal cross-sectional view of the middle portion of the height adjustable seatpost illustrated in FIG. 9.

As shown in FIGS. 11 to 13, the state-changing structure 30 further includes a movable piston 60. The movable piston 60 is formed in a substantially cylindrical shape. The movable piston 60 is disposed between the first hydraulic chamber 51 and the fourth hydraulic chamber 54 to change a volume ratio between the first hydraulic chamber 51 and the fourth hydraulic chamber 54. Specifically, the movable piston 60 is disposed in the space between the inner peripheral surface of the second member 14 and the outer peripheral surface of the inner tube 58 in the radial direction. Thus, the movable piston 60 is slidably supported between the second member 14 and the inner tube 58. The movable piston 60 is configured to be movable between the second member 14 and the inner tube 58 in the axial direction. In this way, the movable piston 60 is configured to be movable between the first hydraulic chamber 51 and the fourth hydraulic chamber 54 in the axial direction. The compressible fluid FL3 in the fourth hydraulic chamber 54 biases the movable piston 60 toward the first hydraulic chamber 51.

In the closed state, the incompressible fluid FL1 is immovable between the first hydraulic chamber 51 and the second hydraulic chamber 52, and the movable piston 60 is also substantially stable. In the closed state, the bicycle seat S is held at an adjusted height position where a bicycle user sets. In this case, the incompressible fluid FL1 doesn't move between the first hydraulic chamber 51 and the second hydraulic chamber 52, because the valve 48 is closed by the state-changing structure 30.

In the open state, the incompressible fluid FL1 moves between the first hydraulic chamber 51 and the second hydraulic chamber 52 as the second member 14 moves relative to the first member 12 in the axial direction. Then, the movable piston 60 moves in the axial direction by the movement of the incompressible fluid FL1. For example, the movable piston 60 moves downward as the incompressible fluid FL1 moves from the first hydraulic chamber 51 to the second hydraulic chamber 52. In this case, the fourth hydraulic chamber 54 expands, the first hydraulic chamber 51 shrinks, and the second hydraulic chamber 52 expands. Thereby, the saddle S moves upward. Also, for example, the movable piston 60 moves upward as the incompressible fluid FL1 moves from the second hydraulic chamber 52 to the first hydraulic chamber 51. In this case, the fourth hydraulic chamber 54 shrinks, the first hydraulic chamber 51 expands, and the second hydraulic chamber 52 shrinks. Thereby, the saddle S moves downward.

Here, in the illustrated embodiment, the state-changing structure 30 further includes a dividing member 62. The dividing member 62 is configured to receive an end portion of the valve body 48A. In particular, the dividing member 62 slidably receive the valve body 48A. In this way, in the illustrated embodiment, the third hydraulic chamber 53 is defined between the dividing member 62 and the valve 48. The dividing member 62 is attached to the valve seat support 58. Specifically, the dividing member 62 forms the third hydraulic chamber 53 with the valve body 48A. The dividing member 62 is disposed in the second member 14. The third hydraulic chamber 53 is configured such that the compressible fluid FL2 biases the valve body 48A toward the valve seat 48B in the open state. The third hydraulic chamber 53 is configured to increase in volume as the valve body 48A is moved toward the valve seat 48B, and is configured to decrease in volume as the valve body 48A is moved away from the valve seat 48B. In the illustrated embodiment, the third hydraulic chamber 53 is configured to be disposed closer to the second distal end 14a of the second member 14 than the first hydraulic chamber 51.

As best seen in FIG. 13, the valve 48 defines a port that is selectively opened and closed. In particular, the valve body 48A and the valve seat 48B defines the port that is selectively opened and closed by axial movement of the valve body 48A relative to the valve seat 48B. The port of the valve 48 fluidly connects the first hydraulic chamber 51 and the second hydraulic chamber 52 between the valve body 48A and the valve seat 48B. The valve body 48A is configured to fluidly separate the first hydraulic chamber 51 from the second hydraulic chamber 52 in the closed state and to fluidly connect the first hydraulic chamber 51 to the second hydraulic chamber 52 in the open state. In other words, the valve body 48A is movable relative to the valve seat 48B in the axial direction to change a valve state between a closed state and an open state. As shown in FIGS. 11 and 12, the valve body 48A is movable in the first movement direction D1 and the second movement direction D2 between the open position to open the port of the valve 48 and the closed position to close the port of the valve 48. In this way, the state-changing structure 30 is configured such that the incompressible fluid FL1 moves between the first hydraulic chamber 51 and the second hydraulic chamber 52.

As shown in FIGS. 10 to 13, in the illustrated embodiment, the first hydraulic chamber 51 is primarily defined by the second member 14, the movable piston 60, the inner tube 58, the valve body 48A and the support rod 56. The second hydraulic chamber 52 is primarily defined by the saddle mounting structure 16, the inner tube 58 and the dividing member 62. The third hydraulic chamber 53 is primarily defined by the valve body 48A and the dividing member 62. The fourth hydraulic chamber 54 is primarily defined by the second member 14, the saddle mounting structure 16, the inner tube 58 and the movable piston 60.

Figure 14:
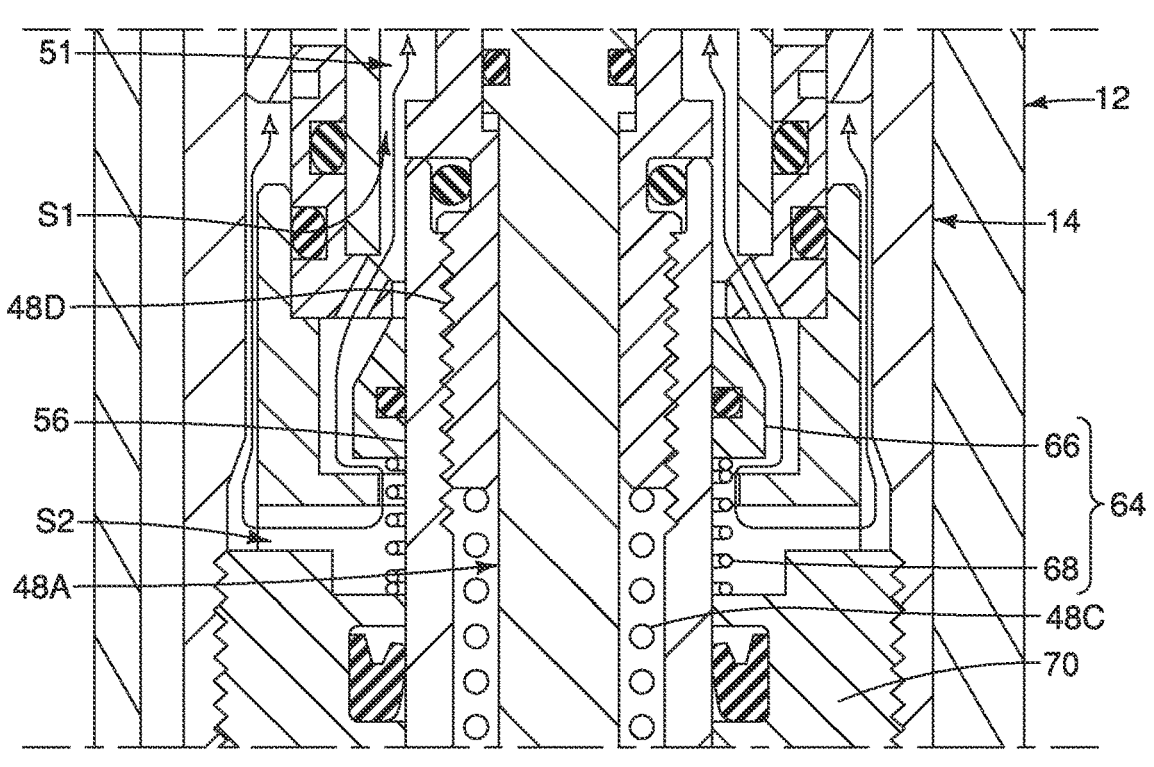
FIG. 14 is an enlarged longitudinal cross-sectional view of the middle portion of the height adjustable seatpost illustrated in FIG. 10, but with a check valve opened.
Figure 15:
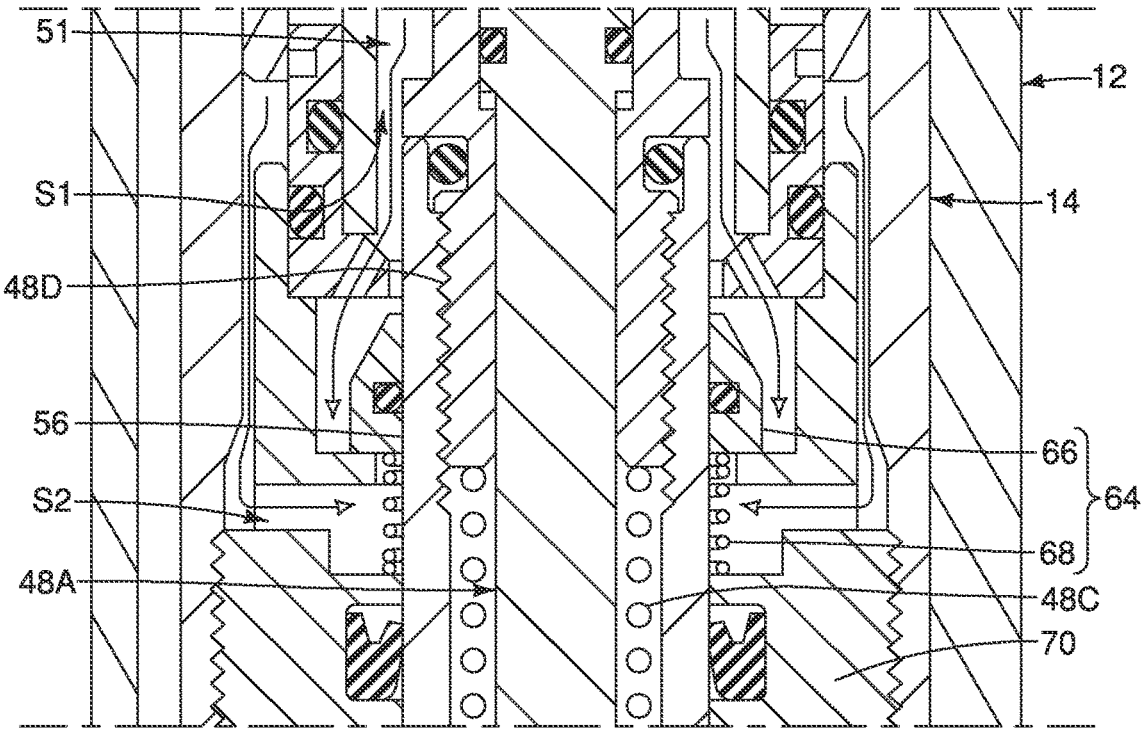
FIG. 15 is an enlarged longitudinal cross-sectional view, similar to FIG. 14, of the middle portion of the height adjustable seatpost illustrated in FIG. 10, but with the check valve closed.

As best seen in FIGS. 14 and 15, the state-changing structure 30 further includes a check valve 64 that is disposed in a fluid passage 65 of the first hydraulic chamber 51. The check valve 64 divides the first hydraulic chamber 51 into a first space S1 and a second space S2. The check valve 64 is normally biased towards an open position as seen in FIG. 14 so that the incompressible fluid FL1 can freely flow between the first space S1 and the second space S2. When the valve 48 of the state-changing structure 30 is in a closed position, as seen in FIG. 15, the incompressible fluid FL1 is prevented from the flow between the first space S1 and the second space S2.

When the valve 48 of the state-changing structure 30 is switched from the closed state to the open state, the incompressible fluid FL1 flows from the second hydraulic chamber 52 to the first hydraulic chamber 51 via the port of the valve 48. Since the incompressible fluid FL1 in the second hydraulic chamber 52 has a higher fluid pressure than the incompressible fluid FL1, a volume change occurs during the switching operation of the valve 48 of the state-changing structure 30. The third hydraulic chamber 53 with the compressible fluid FL2 compensates for this volume change that occurs during the switching operation of the valve 48 of the state-changing structure 30. With this arrangement, the volume change does not affect the check valve 64, so that the check valve 64 does not become stuck during the switching operation of the valve 48 of the state-changing structure 30.

In the illustrated embodiment, the check valve 64 includes a valve body 66 and a biasing member 68. An end plug 70 is fixed to the second end portion 22b of the second member 14, and supports the check valve 64 on the second member 14 so that the check valve 64 moves with the second member 14 as the second member 14 moves axially relative to the first member 12. The valve body 66 is a substantially annular member that is slidable disposed around the support rod 56 for movement in the axial direction. The biasing element 68 is a coil compression spring that is disposed around the support rod 56. The end plug 70 acts as an abutment for the biasing element 68, and also aids in supporting the support rod 56. The biasing element 68 applies a biasing force on the valve body 66 to urge the valve body 66 towards the open position as seen in FIG. 14.

With the valve 48 is in the open state, the saddle S and the second member 14 moves upward with respect to the first member 12 due to the force of the compressible fluid FL3 applying a force on the movable piston 60 in a downward direction which causes the incompressible fluid FL1 to flow from the first hydraulic chamber 51 to the second hydraulic chamber 52 via the fluid passage 65 and the port of the valve 48. More specifically, with the check valve 64 in the open position, the incompressible fluid FL1 is forced upward through the fluid passage 65 by the downward movement of the movable piston 60. Then, with the valve 48 is in the open state, the incompressible fluid FL1 is forced upward through the port of the valve 48 from the first hydraulic chamber 51 to the second hydraulic chamber 52 to force the saddle S and the second member 14 moves upward with respect to the first member 12. When the incompressible fluid FL1 is forced upward through the port of the valve 48, the valve body 66 is pressed upward by flow of the incompressible fluid FL1 and the compressible fluid FL2 in the third hydraulic chamber 53 is compressed.

However, in case that the saddle S is pushed down with the valve 48 is in the open state, the valve body 66 moves upward with respect to the end plug 70 by the sliding resistance between the valve body 66 and the second member 14. In this case, the incompressible fluid FL1 moves from the second hydraulic chamber 52 to the first hydraulic chamber 51 via the port of the valve 48. Also, the incompressible fluid FL1 passes through the fluid passage 65 towards the movable piston 60, while the check valve 64 is held in the open position by the biasing element 68.

In case that the saddle S is pulled up with the valve 48 is in the closed state, the valve body 66 moves downward with respect to the end plug 70 is fixed to the second proximal end 14*b* of the second member 14 against the force of the biasing element 68 as seen in FIG. 145. Specifically, the pressure of the incompressible fluid FL1 increases in space between the port of the valve 48 and the valve body 66 to move the valve body 66 downward overpowering the force of the biasing element 68. Thus, the valve body 66 is pressed downward by the incompressible fluid FL1 abut against the end plug 70 to close an annular gap between the end plug 70 and the support rod 56. In this way, the valve body 66 prevents the incompressible fluid FL1 in the first hydraulic chamber 51 from flowing from the second space S2 towards toward the first space S1. Thereby, the incompressible fluid FL1 in the first hydraulic chamber 51 is substantially stable by the check valve 64, even if the saddle S is manually pulled up while the valve 48 is in the closed state.

Turning now to FIGS. 16 to 22, the mechanical actuator 18A will now be discussed in more detail. The mechanical actuator 18A is configured to move the coupling rod 50 in the longitudinal direction D to selectively open and close the valve 48 of the state-changing structure 30. Thus, in the illustrated embodiment, the first movement direction D1 and the second movement direction D2 are the same as the longitudinal direction D. However, the mechanical actuator

18A and the valve 48 can be configured such that the movement direction of the coupling rod 50 can be non-parallel to the longitudinal direction D if needed and/or desired.

Figure 19:
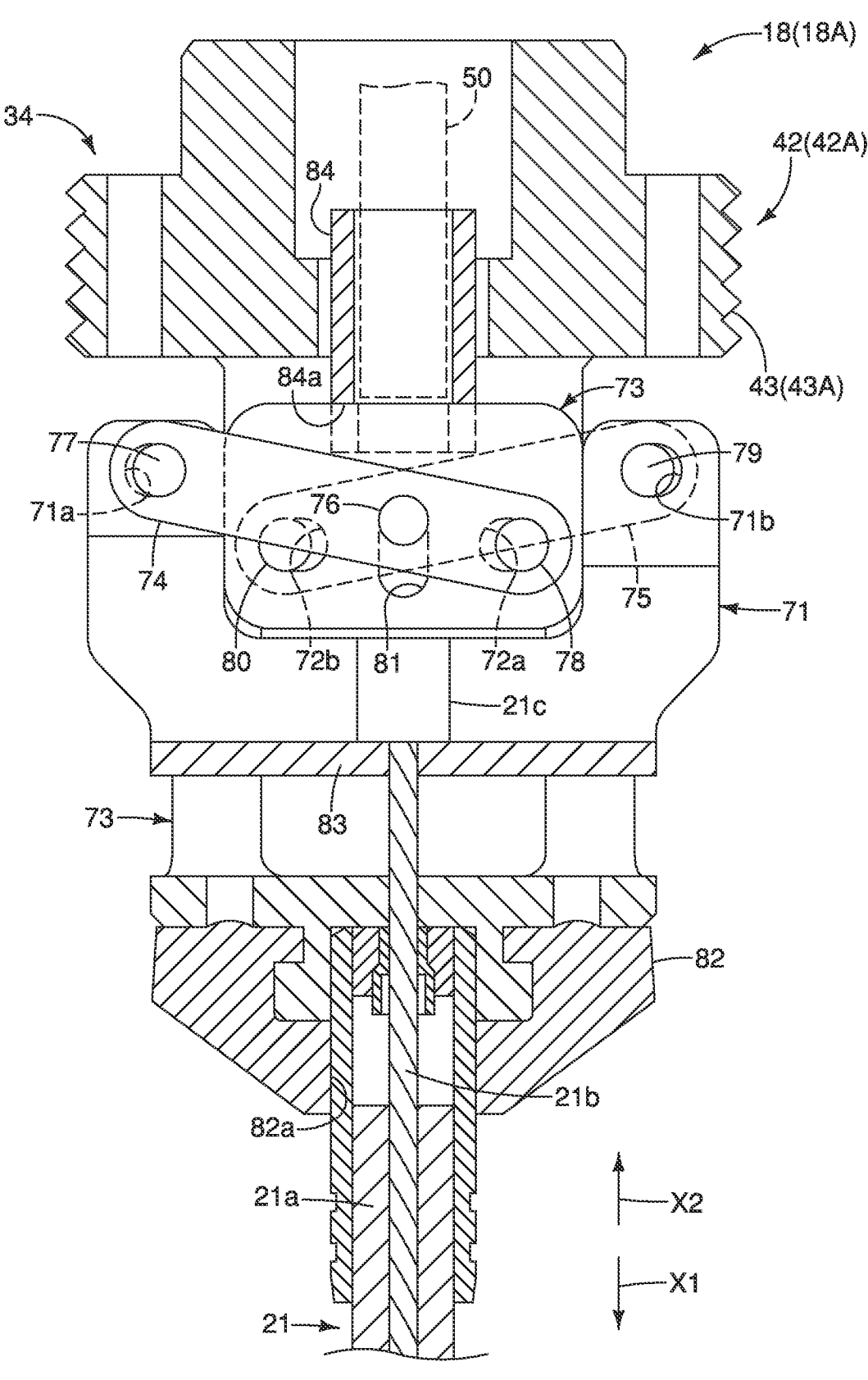
FIG. 19 is a cross-sectional view of the mechanical actuator taken along section line 19-19 of FIG. 17 in which the mechanical actuator is in an initial position (rest position).
Figure 20:
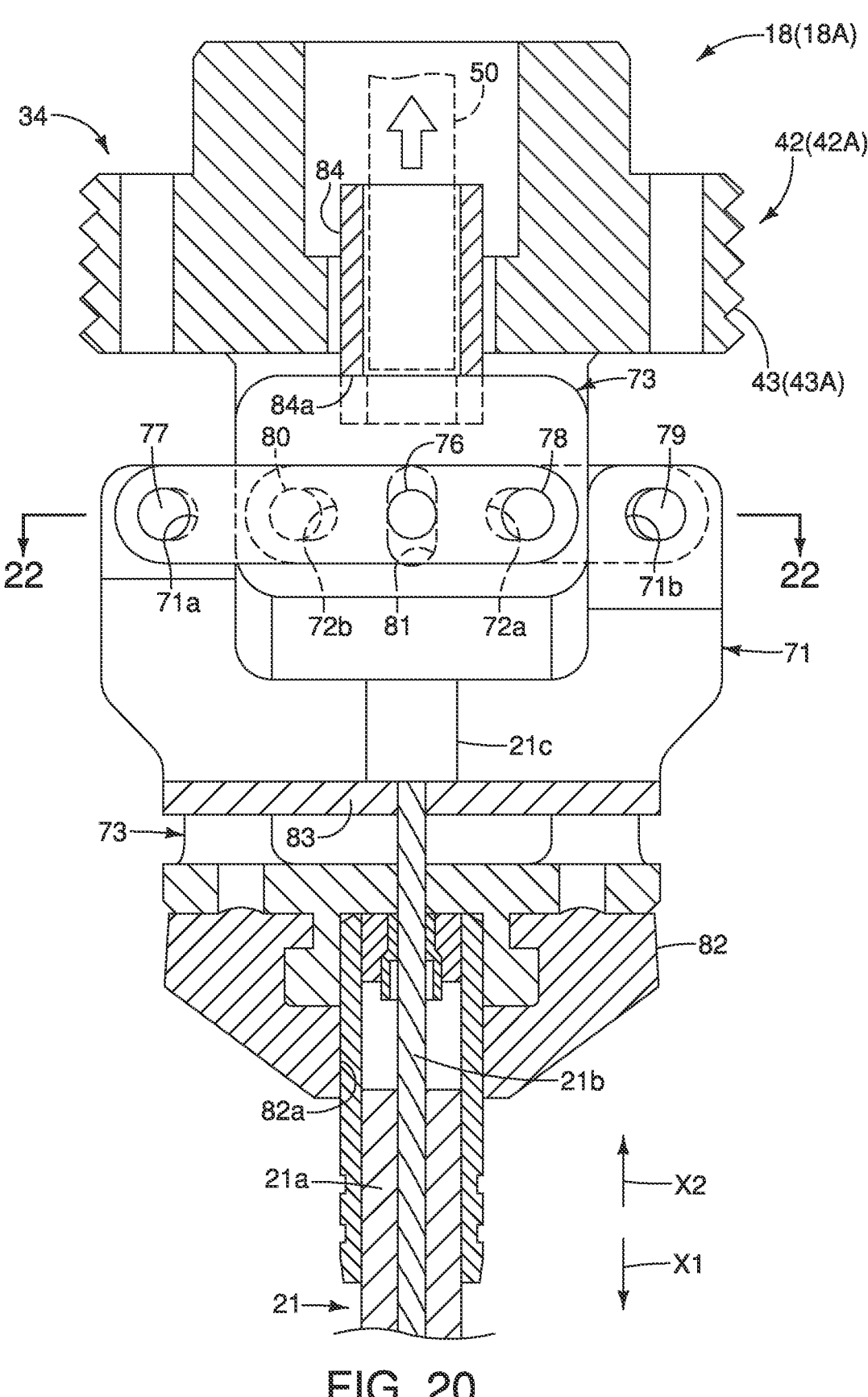
FIG. 20 is a cross-sectional view, similar to FIG. 19, of the mechanical actuator but in which the mechanical actuator is in an intermediate position (partly operated position).
Figure 21:
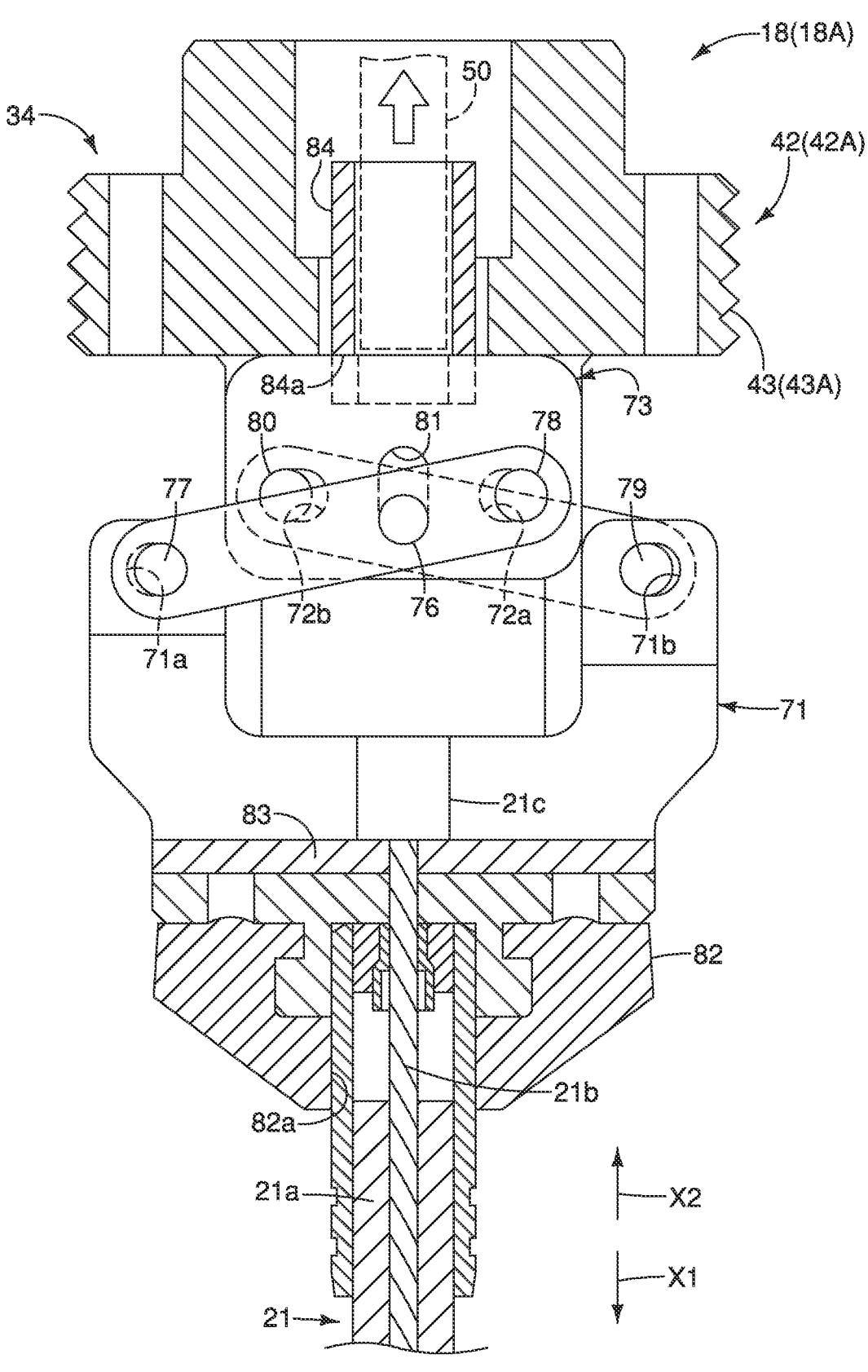
FIG. 21 is a cross-sectional view, similar to FIG. 19, of the mechanical actuator but in which the mechanical actuator is in an actuated position (fully operated position).

As seen in FIGS. 19 to 21, the mechanical actuator 18A basically includes an input member 71 and an output member 72. The input member 71 is configured to receive an operating force to move in a first direction X1. In particular, the input member 71 is configured to receive a pulling force to move in the first direction X1. The output member 72 is coupled to the input member 71 to move in a second direction X2, which is opposite to the first direction X1, in accordance with a movement of the input member 71. The output member 72 is configured to actuate the state-changing structure 30 in the second state.

Figure 10:
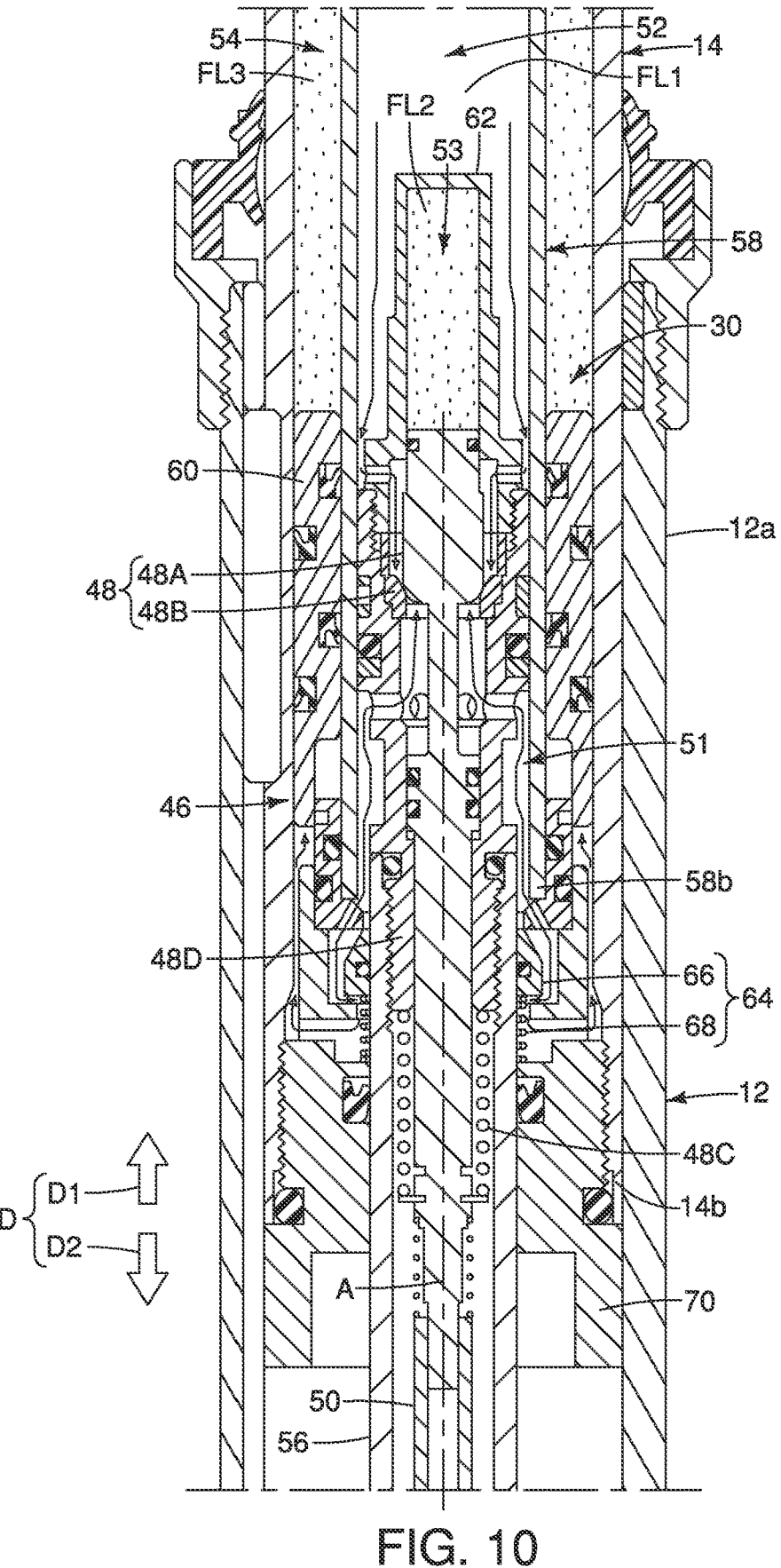
FIG. 10 is a longitudinal cross-sectional view of a middle portion of the height adjustable seatpost illustrated in FIG. 9 in which the valve is in a closed state.

The mechanical actuator 18A further comprises a supporting member 73. Here, the first connecting portion 34 is integrally formed with the supporting member 73. Thus, the thread 43 of the additional fastening portion 42 is threaded into the fastening portion 40 of the first member 12 to couple the supporting member 73 to the first member 12. The input member 71 is movable relative to the supporting member 73 between an initial position (FIG. 19) and an actuated position (FIG. 21) through an intermediate position (FIG. 20). The initial position (FIG. 19) corresponds to the closed position of the coupling rod 50 in which the valve 48 is closed (FIG. 10). The actuated position (FIG. 21) corresponds to the open position of the coupling rod 50 in which the valve 48 is opened (FIG. 11).

The mechanical actuator 18A further includes a first link 74 (i.e., a first coupling member) and a second link 75 (i.e., a second coupling member). The input member 71 and the output member 72 are coupled together by the first link 74 and the second link 75. As seen in FIGS. 19 to 22, the mechanical actuator 18A further comprises a support pin 76 pivotally coupling the first link 74 and the second link 75 to the supporting member 73. Thus, the input member 71 is movably coupled to the supporting member 73 by the first link 74 and the second link 75. The output member 72 is also movably coupled to the supporting member 73 by the first link 74 and the second link 75.

Figure 22:
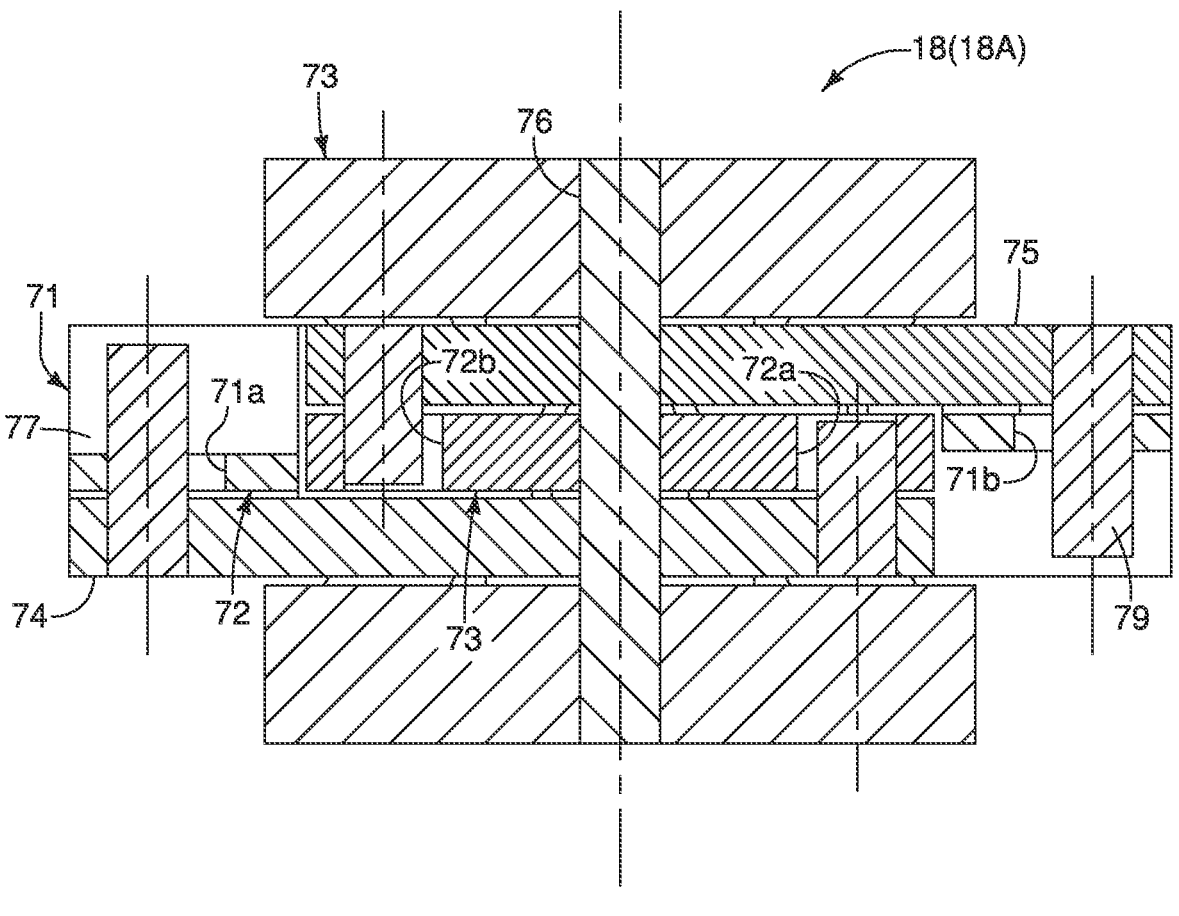
FIG. 22 is a cross-sectional view of the mechanical actuator taken along section line 22-22 of FIG. 20 (the intermediate position).

In particular, one end of the first link 74 is pivotally coupled to the input member 71 by a first pivot pin 77. Here, as seen in FIG. 22, the input member 71 includes a first elongated hole 71*a*. The first pivot pin 77 extends through the first elongated hole 71*a*. The other end of the first link 74 is pivotally coupled to the output member 72 by a second pivot pin 78. Here, as seen in FIG. 22, the output member 72 includes a first elongated hole 72*a*. The second pivot pin 78 extends through the first elongated hole 72*a*. Also, one end of the second link 75 is pivotally coupled to the input member 71 by a third pivot pin 79. Here, as seen in FIG. 22, the input member 71 includes a second elongated hole 71*b*. The third pivot pin 79 extends through the second elongated hole 71*b*. The other end of the second link 75 is pivotally coupled to the output member 72 by a fourth pivot pin 80. Here, as seen in FIG. 22, the output member 72 includes a second elongated hole 72*b*. The second pivot pin 78 extends through the second elongated hole 72*b*.

The supporting member 73 has an elongated slot 81. The support pin 76 extends through the elongated hole 81. The elongated hole 81 extends in the second direction X2. In this way, the supporting member 73 can move in the second direction X2 in response to a movement of the input member 71 in the first direction X1. While the elongated hole 81 is provided at the output member 72 in this embodiment, the elongated hole 81 can be provided at the input member 71.

The elongated hole 81 can have other shapes such as a round shape. The elongated hole 81 can extend in a direction other than the second direction X2 depending the construction of the other parts if the height adjustable seatpost ASP. Also, in this embodiment, the support pin 76 is separate member from the first link 74, the second link 75, and the supporting member 73. However, the support pin 76 can be integrally provided with one of the first link 74, the second link 75, and the supporting member 73 as a one-piece unitary member.

In this embodiment, for example, each of the first link 74 and the second link 75 is an elongated link member. The input member 71 is a plate having a forked shape. The output member 72 is a plate. However, the shapes of the input member 71, the first link 74, the second link 75 and the output member 72 are not limited to this embodiment. While the mechanical actuator 18A includes the second link 75 in this embodiment, the second link 75 can be omitted from the mechanical actuator 18A. Also, while the second direction X2 is substantially parallel to the first direction X1 in this embodiment, the second direction X2 can be angularly offset from the first direction X1. The first direction X1 and the second direction X2 are parallel to the longitudinal direction D.

In this embodiment, the input member 71 is operatively coupled to the operating device 20. The input member 71 is configured to receive the operating force in accordance with an operating amount of the operating device 20. The operating device 20 includes one of a cable operating device and a hydraulic operating device. Here, the operating device 20 is a cable operating device that is coupled to a nipple 21c of the control cable 21. Thus, the input member 71 is operatively coupled to the control cable 21 to receive the pulling force from the control cable 21. However, the input member 71 can be operatively coupled to other mechanical members such as a rod, a link and a hydraulic piston.

The output member 72 is operatively coupled to the state-changing structure 30 to change the state of the height adjustable seatpost ASP between the locked state and the adjustment state in response to the movement of the input member 71. In particular, the output member 72 is operatively coupled to the valve 48 of the state-changing structure 30 via the coupling rod 50 to operate the valve 48 in response to the movement of the input member 71. In this embodiment, the mechanical actuator 18A is used to actuate the state-changing structure 30 of the height adjustable seatpost ASP. However, the mechanical actuator 18A can be applied to other devices, for example a suspension, a handlebar stem, etc.

Figure 16:
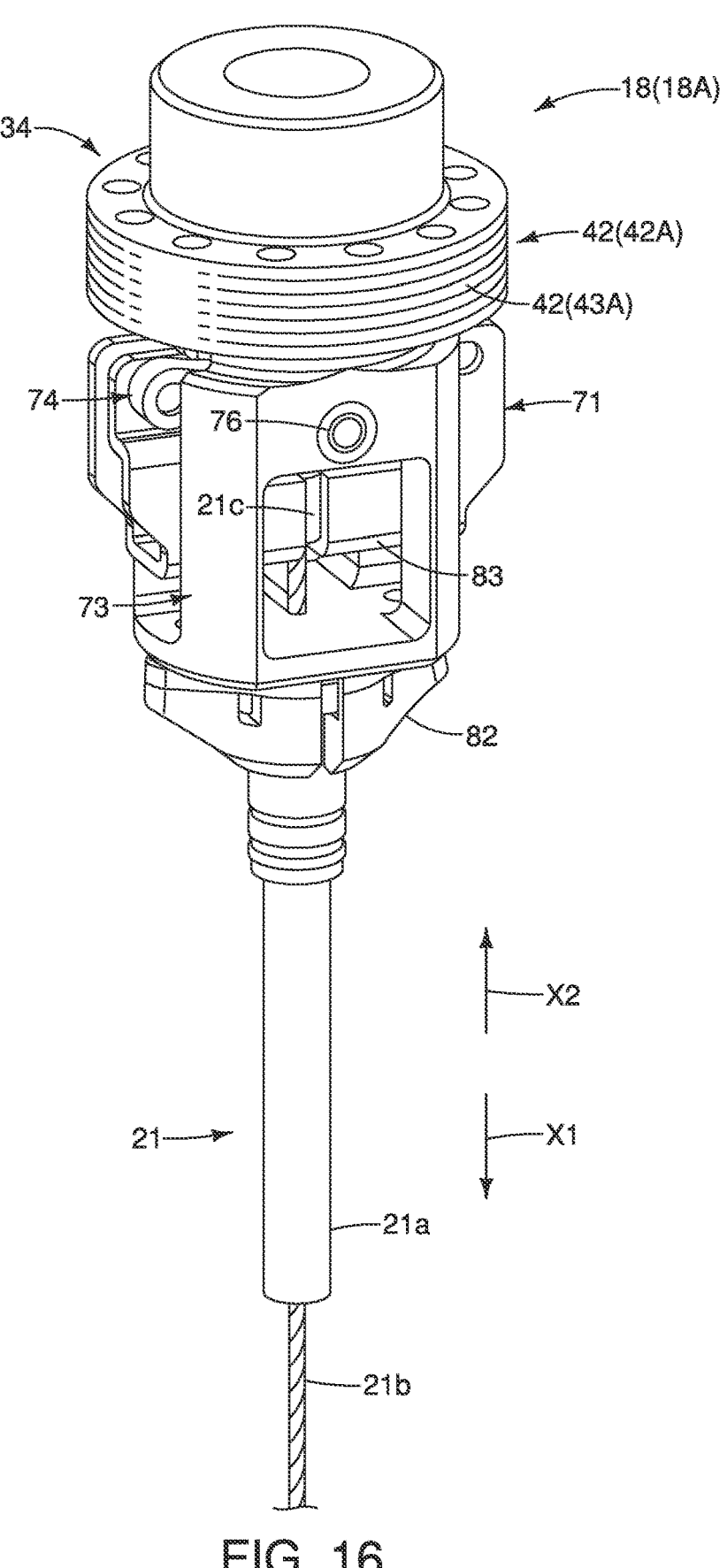
FIG. 16 is a perspective view of the mechanical actuator illustrated in FIGS. 2 and 5.
Figures 17, 18:
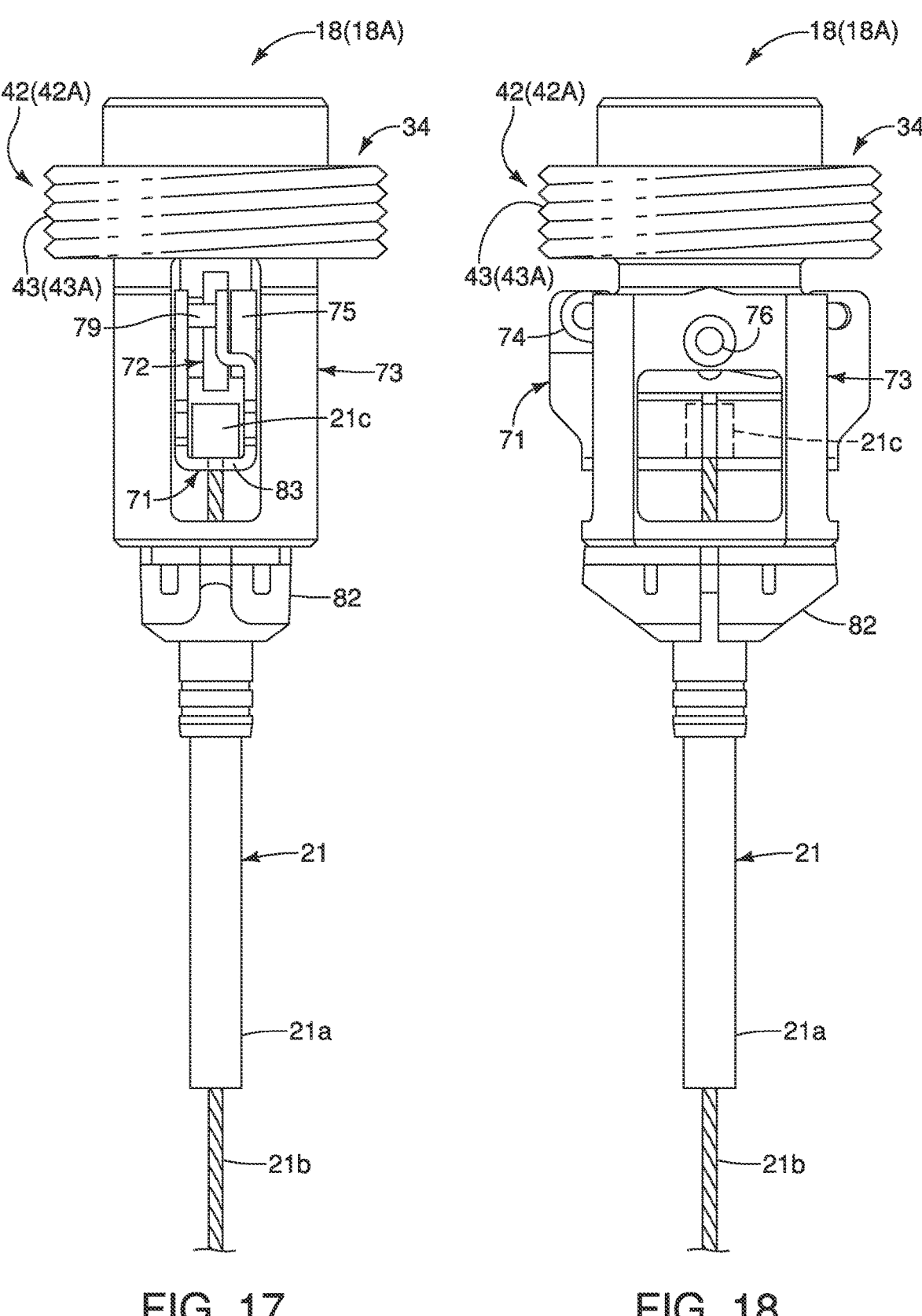
FIG. 17 is a first elevational view of the mechanical actuator illustrated in FIG. 16.
FIG. 18 is a second elevational view of the mechanical actuator illustrated in FIGS. 16 and 17.

The supporting member 73 further a cable receiving part 82. The cable receiving part 82 includes a cable receiving hole 82a. The cable receiving hole 82a is configured to receive an end of the outer casing 21a of the control cable 21. As seen in FIG. 16, the input member 71 includes a cable attachment part 83 configured to be coupled to the control cable 21. An end of the inner wire 21b of the control cable 21 is coupled to the cable attachment part 83. In this embodiment, the cable attachment part 83 includes an attachment recess and an attachment slit. The control cable 21 includes a coupling element or nipple 21c that is secured to the end of the inner wire 21b. The nipple 21c is provided in the attachment recess of the cable attachment part 83. The inner wire 21b extends through the attachment slit of the cable attachment part 83.

The output member 72 includes a transmitting part 84 to transmit a movement of the output member 72 in the second direction X2. In this embodiment, the transmitting part 84 transmits the movement of the output member 72 in the second direction X2 to the coupling rod 50 so that the coupling rod 50 moves in the first movement direction D1. Thus, the output member 72 outputs a pushing force to the coupling rod 50. The transmitting part 84 is engaged with a lower end of the coupling rod 50 when the mechanical actuator 18A is mounted to the first member 12. The transmitting part 84 includes an engagement recess 84a for receiving the upper end of the output member 72.

Turning now to FIGS. 23 to 27, the electric actuator 18B will now be discussed in more detail. The electric actuator 18B is configured to move the coupling rod 50 in the longitudinal direction D to selectively open and close the valve 48 of the state-changing structure 30. However, the electric actuator 18B and the valve 48 can be configured such that the movement direction of the coupling rod 50 can be non-parallel to the longitudinal direction D if needed and/or desired.

The electric actuator 18B basically comprises a housing 86 that includes the second connecting portion 36, which is detachably coupled to the actuator receiving part 32 of the first member 12. As mentioned above, the second connecting portion 36 includes the additional fastening portion 42B, which is detachably coupled to the fastening portion 40 of the actuator receiving part 32. More specifically, the thread 43B of the additional fastening portion 42B threadedly engages the thread 41 of the fastening portion 40 to detachably couple the electric actuator 18B to the first member 12. Here, the housing 86 includes a first part 87 and a second part 88. The first part 87 and the second part 88 are coupled together to enclose the internal parts of the electric actuator 18B. Here, the second part 88 includes the second connecting portion 36.

Figure 27:
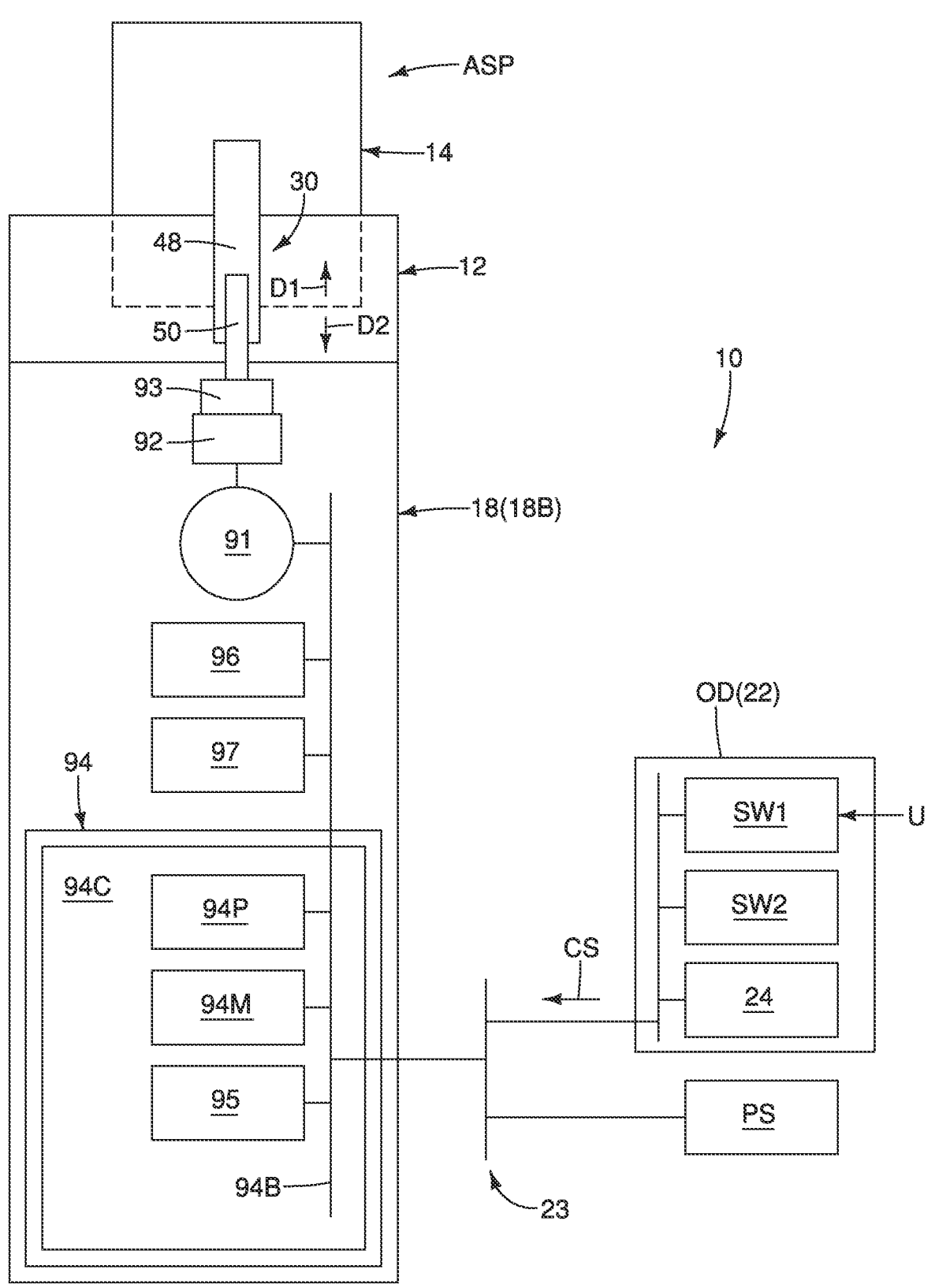
FIG. 27 is a schematic block diagram of the rider-posture changing assembly illustrated in FIG. 3 in which wired communications are used.

As diagrammatically illustrated in FIG. 27, the electric actuator 18B is electrically connected to the power-supply PS. The power supply PS is provided to at least one of the first member 12, the second member 14, the electric actuator 18B and a remote device. Here, as seen in FIG. 1, the power-supply PS is integrated with the drive unit DU (e.g., a remote device). Alternatively, the height adjustable seatpost ASP can be provided with its own power-supply that is provided to one of the first member 12, the second member 14, the electric actuator 18B.

Figure 23:
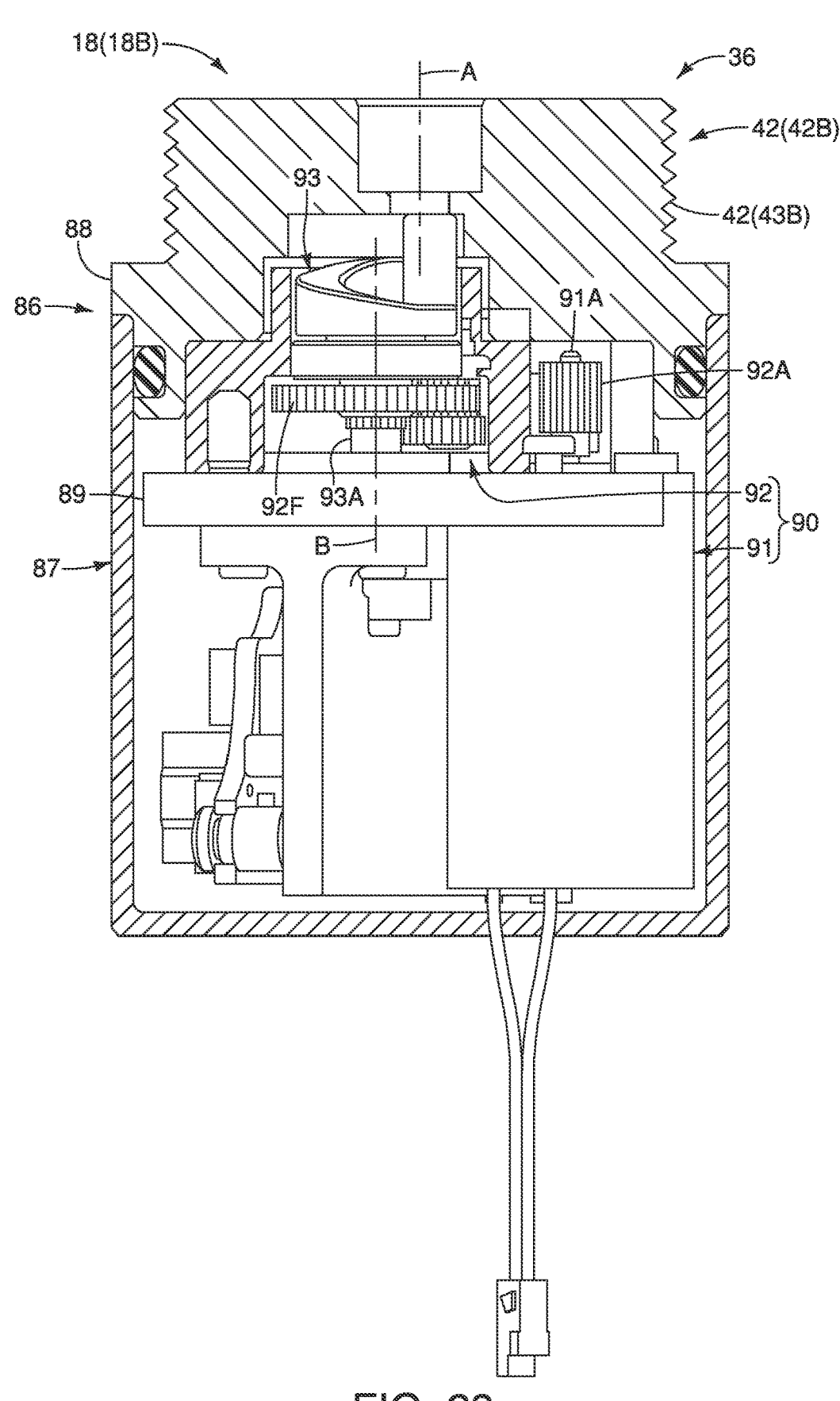
FIG. 23 is a cross-sectional view of the first electric actuator illustrated in FIGS. 3 and 5.
Figure 24:
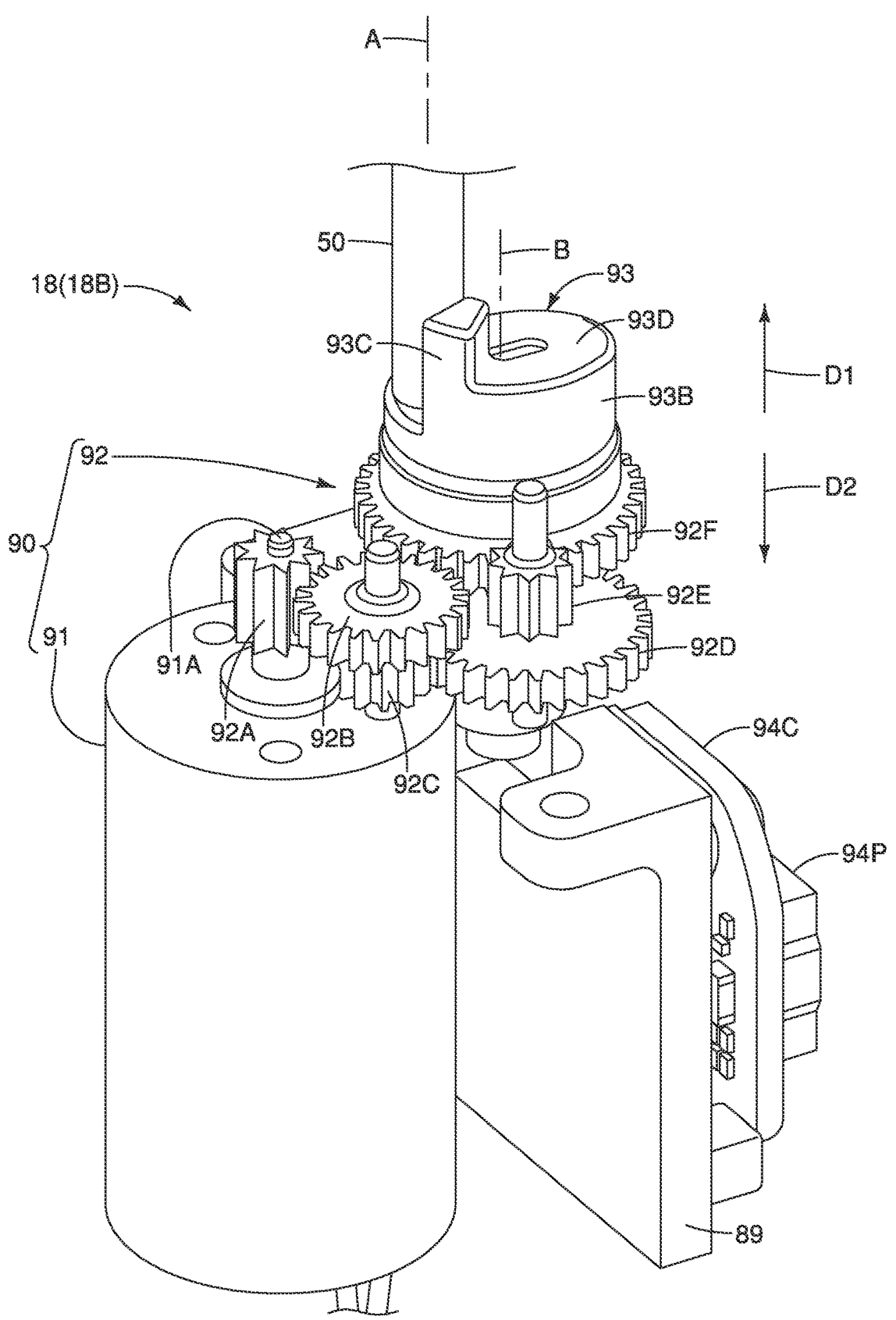
FIG. 24 is a partial perspective view of an internal structure of the first electric actuator illustrated in FIG. 23.
Figure 25:
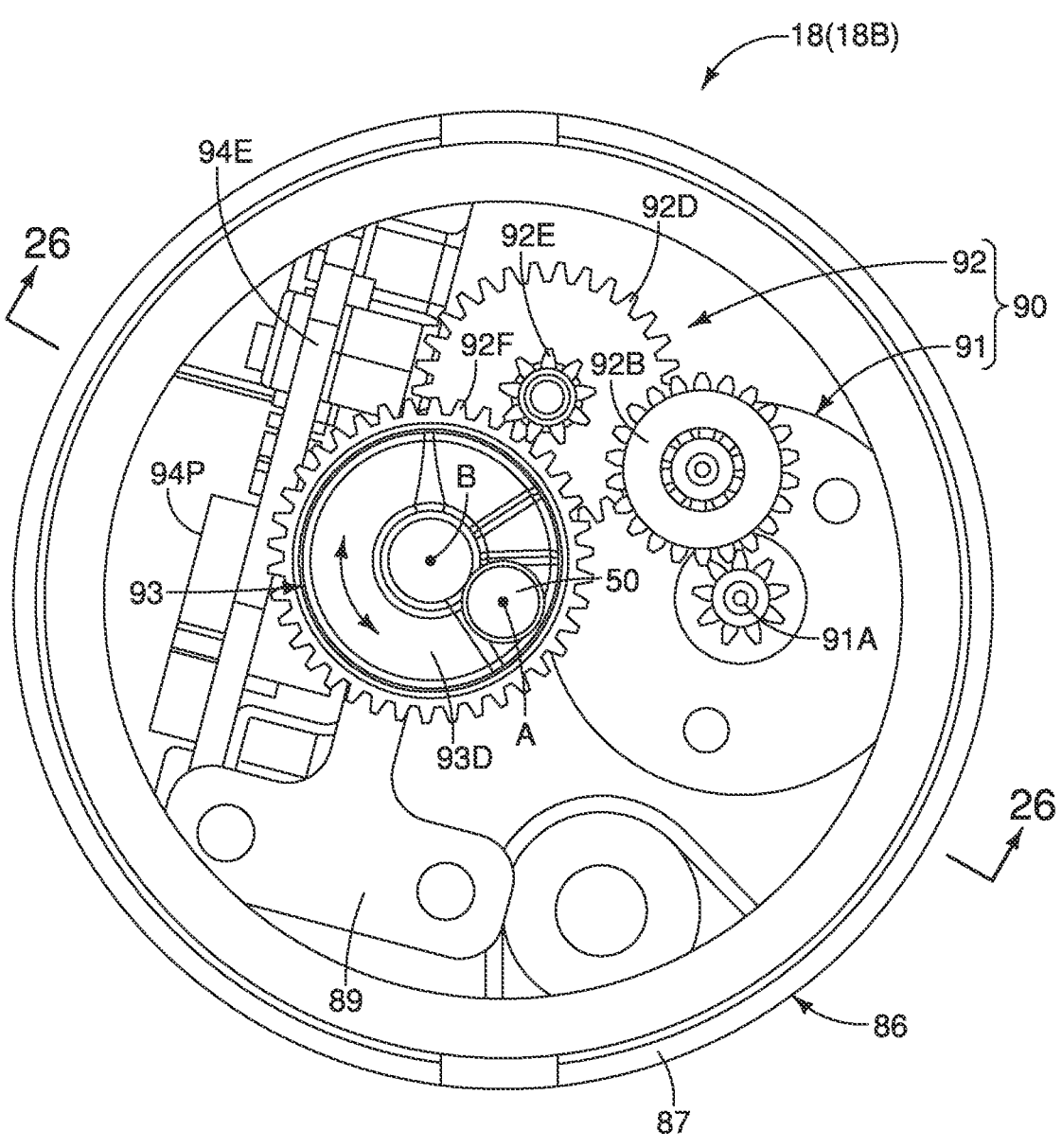
FIG. 25 is a plan view of the internal structure of the first electric actuator illustrated in FIGS. 23 and 24.

As seen in FIGS. 23 to 25, the electric actuator 18B further comprises an actuating device 90. The actuating device 90 is configured to actuate the state-changing structure 30 in accordance with an electrical signal from the operating device 22 (OD). The actuating device 90 is provide inside the housing 86. Here, the housing 86 includes a plurality of parts that are connected together to enclose the parts of the actuating device 90 therein.

The actuating device 90 includes at least one of a motor and a solenoid. Here, the actuating device 90 includes an electric motor 91. For example, the electric motor 91 includes a reversible direct-current motor and a reversible stepper motor. Also, here, the actuating device 90 further includes a gear reducer 92 and a cam member 93. The gear reducer 92 is operatively coupled between an output shaft 91A of the electric motor 91 and a shaft portion 93A of the cam member 93. Thus, rotation of the output shaft 91A of the electric motor 91 is transmitted to the cam member 93 such that the cam member 93 rotates at a slower speed than the output shaft 91A of the electric motor 91.

Basically, the cam member 93 is configured to actuate the state-changing structure 30 via the coupling rod 50 to change the state of the rider-posture changing assembly 10. The coupling rod 50 is coupled to the valve 48 to move the valve 48 as mentioned above. The cam member 93 is rotatable about a rotational axis B defined by the shaft portion 93A of the cam member 93. The cam member 93 is rotatable relative to the coupling rod 50 about the rotational axis B to move the coupling rod 50 relative to the cam member 93 in either the first movement direction D1 or the second movement direction D2 depending on the current rotational position of the cam member 93. Thus, the cam member 93 is rotatable relative to the coupling rod 50 about the rotational axis B to move the valve 48 relative to the cam member 93 and the first member 12 in either the first movement direction D1 or the second movement direction D2 depending on the current rotational position of the cam member 93. As mentioned above, the coupling rod 50 extends along the center axis A. The center axis A is parallel to the first movement direction D1, the second movement direction D2 and the rotational axis B. In the present embodiment, the center axis A is offset from the rotational axis B. However, the center axis A can coincide with the rotational axis B if needed and/or desired.

The output shaft 91A of the electric motor 91 is coupled to the cam member 93 to rotate the cam member 93 about the rotational axis B. The output shaft 91A of the electric motor 91 is coupled to a rotor of the electric motor 91. The gear reducer 92 is configured to reduce a rotational speed of the cam member 93 compared with a rotational speed of the output shaft 91A. The gear reducer 92 includes an output gear 92A, a first intermediate gear 92B, a second intermediate gear 92C, a third intermediate gear 92D, a fourth intermediate gear 92E and a receiving gear 92F. The output gear 92A is attached to the output shaft 91A to be rotatable along with the output shaft 91A. The receiving gear 92F is attached to the shaft portion 93A of the cam member 93 to be rotatable along with the cam member 93 about the rotational axis B. The output gear 92A meshes with the first intermediate gear 92B. The second intermediate gear 92C meshes with the third intermediate gear 92D. The fourth intermediate gear 92E meshes with the receiving gear 92F. The structure of the gear reducer 92 is not limited to the illustrated structure.

Figure 26:
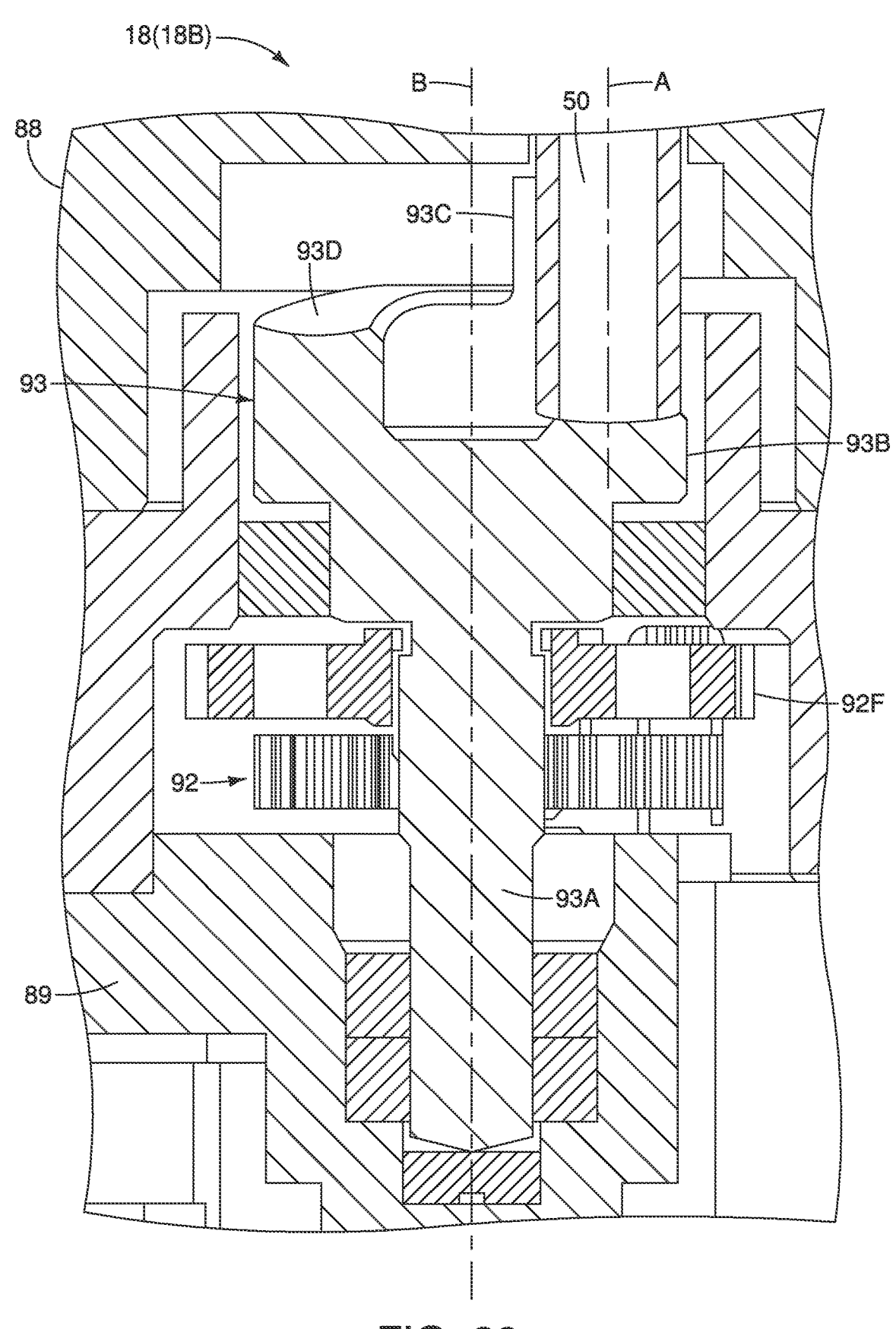
FIG. 26 is a cross-sectional view of the first electric actuator illustrated in FIGS. 17 to 25 taken along section line 26-26 of FIG. 25.

As seen in FIG. 26, the cam member 93 is rotatably supported by the housing 86 about the rotational axis B. The receiving gear 92F is secured to the shaft portion 93A of the cam member 93 to rotate relative to the housing 86 along with the cam member 93. The housing 86 includes a plurality of bushings for rotatably supporting the cam member 93 about the rotational axis B. Thus, the cam member 93 is held between the coupling rod 50 and the housing 86 in the second movement direction D2. The coupling rod 50 and the housing 86 restrict the cam member 93 from moving relative to the housing 86 in the second movement direction D2. As seen in FIG. 26, at least one of the coupling rod 50 and the cam member 93 includes a curved surface contactable with another of the coupling rod 50 and the cam member 93 to move the coupling rod 50 in response to a rotation of the cam member 93.

Referring to FIGS. 24 and 26, the cam member 93 further includes a cam base 93B and a stopper protrusion 93C. The cam base 93B has a curved surface 93D that contacts the lower end of the coupling rod 50. The curved surface 93D spirals about the rotational axis B. The stopper protrusion 93C extends from the cam base 93B in the second movement direction D2. The cam member 93 is configured to move the coupling rod 50 between a first position and a second position in the second movement direction D2. The first position corresponds to the closed position of the valve 48. The second position corresponds to the open position of the valve 48. Thus, the valve 48 is in the closed position in a state where the coupling rod 50 is in the first position. The valve 48 is in the open position in a state where the coupling rod 50 is in the second position.

As seen in FIG. 27, the operating device 22 (OD) is electrically connected to the electric actuator 18B via the electrical cable 23. Thus, the operating device 22 (OD) is configured to communicate with the electric actuator 18B using wired communications. As mentioned above, the operating device 22 (OD) includes the communicator 24 that is configured to carry out power line communication (PLC) with the electric actuator 18B via the electrical cable 23. Alternatively, the communicator 24 also can be configured to carry out wireless communication or both wired communications and wireless communications.

Preferably, the electrical cable 23 is connected to the power-supply PS via the electrical cable 23. Alternatively, the operating device 22 (OD) can have its own electric power source. The operating device 22 (OD) is configured to receive a user input to generate a control signal. The operating device 22 (OD) includes at least one electrical switch SW1 and/or SW2, which is configured to receive a user input to output a control signal CS. For example, the control signal CS indicates a change in the state of the rider-posture changing assembly 10 from the first state to the second state. The structure of the operating device 22 (OD) is not limited to the present embodiment. The operating device 22 (OD) can have another structure if needed and/or desired. The control signal can indicate actions other than the change in the state of the rider-posture changing assembly 10. In the present embodiment, the electrical switch SW1 and/or SW2 is configured to generate the control signal CS as long as the electrical switch SW1 and/or SW2 is depressed by the user. However, the electrical switch SW1 and/or SW2 can be configured to generate the control signal CS having a predetermined length regardless of how long the electrical switch SW1 and/or SW2 is depressed by the user. Preferably, the operating device 22 (OD) is provided at a position (e.g., a handlebar) where the rider can access the operating device 22 (OD).

As seen in FIG. 27, the electric actuator 18B further includes a controller 94. The controller 94 is configured to control the actuating device 90. Basically, the controller 94 is an electronic controller that is preferably a microcomputer or central processing unit (CPU) that includes at least one processor and at least one computer storage device (i.e., computer memory devices). The controller 94 is formed of one or more semiconductor chips that are mounted on a circuit board. The terms "controller" and "electronic controller" as used herein refers to hardware that executes a software program, and does not include a human being. Here, the controller 94 includes at least one processor 94P, a memory 94M, a circuit board 94C and a bus 94B. The processor 94P and the memory 94M are electrically mounted on the circuit board 94C. The processor 94P and the memory 94M are electrically connected to the bus 94B. The processor 94P is electrically connected to the memory 94M via the circuit board 94C and the bus 94B.

For example, the processor 94P includes at least one of a central processing unit (CPU), a micro processing unit (MPU), and a memory controller. The memory 94M is electrically connected to the processor 94P. The memory 94M is any computer storage device (transitory or non-transitory computer-readable medium) with the sole exception of a transitory propagating signal. For example, the memory 94M can include at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 94M includes storage areas each having an address. The processor 94P is configured to control the memory 94M to store data in the storage areas of the memory 94M and reads data from the storage areas of the memory 94M. The processor 94P can also be referred to as a hardware processor 94P. The memory 94M can also be referred to as a hardware memory 94M. The memory 94M can also be referred to as a computer-readable storage medium 94M or computer storage device 94M.

The controller 94 is programed to execute at least one control algorithm of the electric motor 91 to adjust the height of the height adjustable seatpost ASP. The memory 94M (e.g., the ROM) stores at least one program including at least one program instruction. The at least one program is read into the processor 94P, and thereby the at least one control algorithm of the electric motor 91 is executed based on the at least one program. The controller 94 can also be referred to as an electronic controller circuit or circuitry. The controller 94 can also be referred to as a hardware controller 94.

The structure of the controller 94 is not limited to the above structure. The structure of the 22 is not limited to the processor 94P, the memory 94M, and the bus 94B. The controller 94 can be realized by hardware alone or a combination of hardware and software. The processor 94P and the memory 94M can be integrated as a one chip such as an application specific integrated circuit (ASIC) or a field programmable gate array (FPGA).

The electric actuator 18B further includes a communicator 95. The communicator 95 is configured to be electrically connected to the controller 94. As mentioned above, the operating device 22 (OD) includes the communicator 24 that is electrically connected to the electrical switch SW. The communicator 95 is configured to communicate with the communicator 24 of the operating device 22 (OD via a communication channel. In the present embodiment, the communicator 95 is configured to communicate with the communicator 24 via a wired communication channel. However, the communicator 95 can be configured to communicate with the communicator 24 via a wireless communication channel.

The communicator 95 can include a notification unit configured to notify a user of information relating to the communicator 95. The notification unit can include a light emitting diode (LED) configured to indicate the information relating to the communicator 95. The information relating to the communicator 95 can include pairing state (e.g., pairing mode) of the communicator 95 and/or communication status (e.g., transmission and/or receipt of wireless signals).

In the present embodiment, the communication channel is established using power line communication (PLC) technology. More specifically, the electrical cable 23 includes a ground line and a voltage line. The PLC technology is used for communicating between electric components. The PLC carries data on a conductor that is also used simultaneously for electric power transmission or electric power distribution to the electric components. However, the communication channel can include a wireless communication channel.

As seen in FIG. 27, the rider-posture changing assembly 10 further comprises a detector 96. Basically, the detector 96 is configured to detect position information of the second member 14 relative to the first member 12. The detector 96 is configured to output a signal that is indicative of the position of the second member 14 relative to the first member 12. The controller 94 is electrically connected to the detector 96 via the bus 94B so that the signal with the detected position information is received by the controller 94. The controller 94 can than control the electric motor 91 based on the detected position information. Also, the detected position information is configured to be outputted as a signal to a remote device. The detected position information can be outputted to more than one remote device as needed and/or desired. The remote device includes at least one of the drive unit DU, the rear derailleur RD, the main battery pack BP, as well as any other component as needed and/or desired. Thus, the signal with the detected position information can be used for controlling other components as needed and/or desired. Alternatively, the signal with the detected position information can be used for evaluation purposes. The detector 96 is provided to at least one of the first member 12, the second member 14 and the actuator 18B. Here, in the illustrated embodiment, the detector 96 is provided to the actuator 18B. The detector 96 includes at least one of a contact position detector and a non-contact position detector. Here, in the illustrated embodiment, the detector 96 is non-contact position detector. Thus, the detector 96 can be referred to as a position detector 96 or a position sensor 96. Examples of the detector 96 include a potentiometer and a rotary encoder. In the present embodiment, the detector 96 is configured to sense an absolute rotational position of the cam member 93. In other words, the detector 96 is configured to sense a rotational angle of the cam member 93.

The electric actuator 18B further includes a motor driver 97. The electric motor 91 and the controller 94 are electrically connected to the motor driver 97 via the bus 94B. The motor driver 97 is configured to control the electric motor 91 based on a control command from the controller 94, which is based on an input signal from the operating device OD and the detected position information signal from the detector 96.

The controller 94 can have a wake-up mode in which the controller 94 is configured to control the electric motor 91 based on an input signal and a sleep mode in which the controller 94 is suspended under electric power consumption that is lower than electric power consumption in the wake-up mode.

Figure 28:
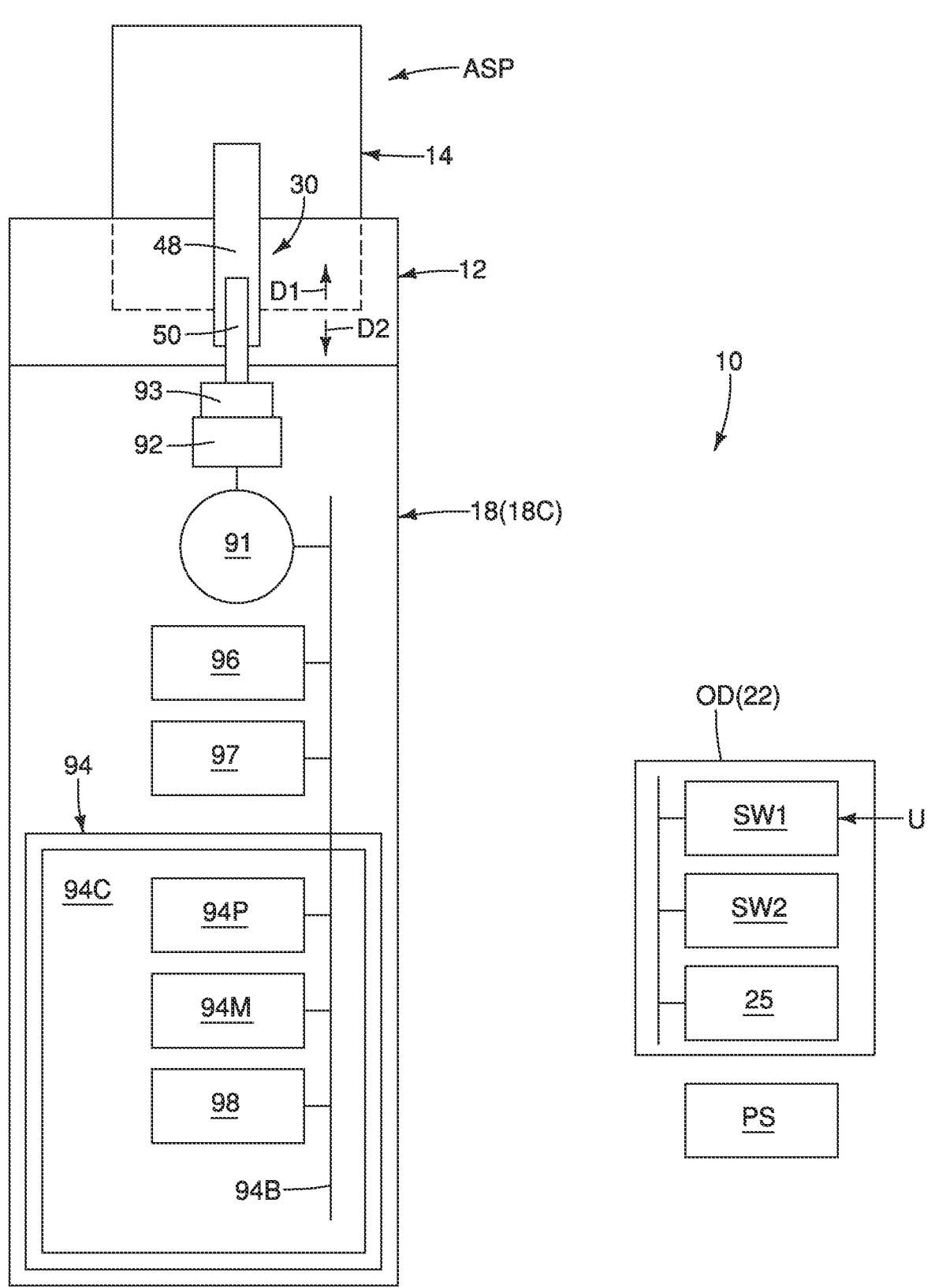
FIG. 28 is a schematic block diagram of the rider-posture changing assembly illustrated in FIG. 4 in which wireless communications are used.

As seen in FIG. 28, the rider-posture changing assembly 10 is illustrated in which the electric actuator 18C is coupled to the first member 12 of the height adjustable seatpost ASP and the electric actuator 18C is controlled by operating the operating device 25 (OD). Here, the electric actuator 18C is configured to wirelessly communicate with the operating device 25 (OD). Thus, the electric actuator 18C includes the wireless communicator 98. As mentioned above, the operating device 25 (OD is provided with the wireless communicator 26 to wirelessly send the electrical signal to the electric actuator 18C. Thus, here, the operating device 25 (OD) wirelessly communicates with the electric actuator 18C. The electric actuator 18C is identical to the electric actuator 18B, which is discussed above, expect that the communicator 95 of the electric actuator 18B has been replaced with the wireless communicator 98 in electric actuator 18C. Accordingly, the reference numerals/symbols that were used in describing the electric actuator 18B will be used to describe the electric actuator 18C. Optionally, the electric actuator 18C can include an antenna that is coupled to the wireless communicator 98 as needed and/or desired. Also, the descriptions of the parts of the electric actuator 18C that are identical to those parts of the actuator 18B will be omitted for the sake of brevity. Likewise, the operating device 25 (OD) is identical to the operating device 22 (OD), which is discussed above, expect that the communicator 24 of the operating device 22 has been replaced with the wireless communicator 26 in the operating device 25 (OD). Accordingly, the reference numerals/symbols that were used in describing the operating device 22 (OD) will be used to describe the operating device 25 (OD). Also, the descriptions of the parts of the operating device 25 (OD) that are identical to those parts of the operating device 22 (OD) will be omitted for the sake of brevity.

Figure 29:
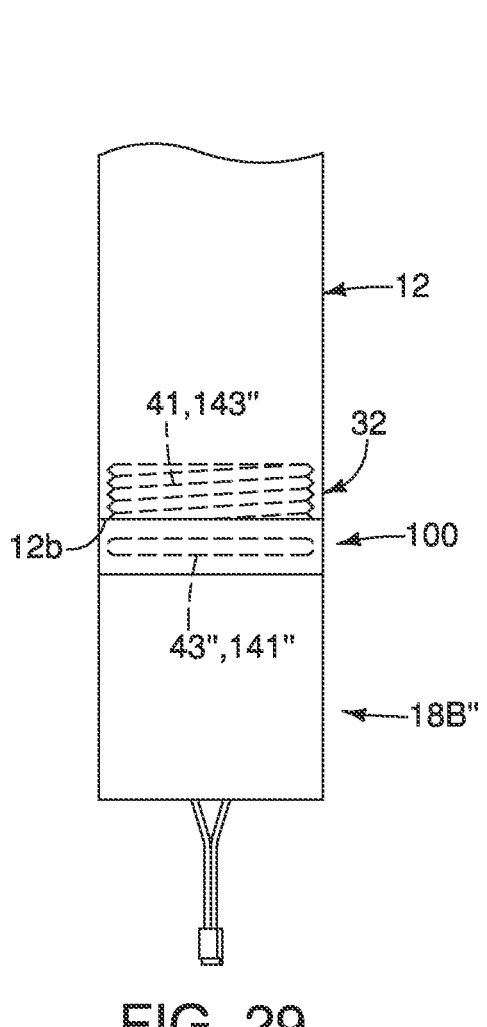
FIG. 29 is a partial elevational view of a bottom portion of the height adjustable seatpost illustrated in FIG. 2 in which the first electric actuator illustrated in FIG. 7 is coupled to the first member using an adapter.
Figure 30:
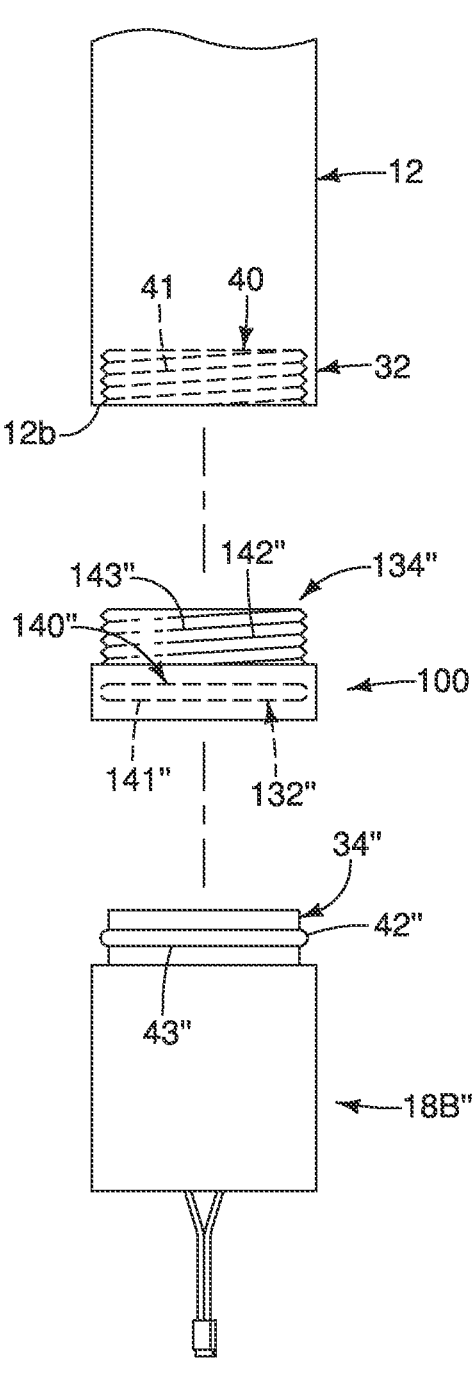
FIG. 30 is an exploded elevational view of the bottom portion of the height adjustable seatpost illustrated in FIG. 29, the first electric actuator illustrated in FIG. 7 and the adapter illustrated in FIG. 29.

Referring now to FIGS. 29 and 30, the actuators 18A', 18A", 18A''', 18B', 18B", 18B''', 18C', 18C" and 18C''' cannot be directly attached to the actuator receiving part 32 of the first member 12. Specifically, in the case of the first member 12, the fastening portion 40 of the actuator receiving part 32 includes the thread 41 for attaching the actuator 18. If the actuators 18A', 18A", 18A''', 18B', 18B", 18B''', 18C', 18C" and 18C''' are to be connected to the actuator receiving part 32 of the first member 12, then the actuator 18 includes an adapter 100. The adapter 100 is provided with one of the first and second connecting portions 34 and 36. The adapter 100 is configured to provide proper installation of the actuator 18A', 18A", 18A''', 18B', 18B", 18B''', 18C', 18C" and 18C''' to the actuator receiving part 32. Preferably, the adapter 100 is a separate member from the actuator 18A', 18A", 18A''', 18B', 18B", 18B''', 18C', 18C" and 18C''' and detachably attachable to the actuator 18A', 18A", 18A''', 18B', 18B", 18B''', 18C', 18C" and 18C'''.

In the illustrated embodiment, the adapter 100 is used to connect the actuator 18B" to the actuator receiving part 32 of the first member 12. In other words, the adapter 100 is used to convert the snap-fit type of connection of the actuator 18B" to a screw type connection for use with the first member 12. Here, the adapter 100 includes an actuator receiving part 132" and a first connecting portion 134". The actuator receiving part 132" has a fastening portion 140" that includes an annular recess 141". In this way, the adapter 100 can be connected to the actuator 18B". In other words, the annular ridge 43B" of the actuator 18B" can be snap-fitted into the annular recess 141" of the adapter 100. The first connecting portion 134" includes an additional fastening portion 142" having a thread 143" that is configured to be screwed to the fastening portion 40 of the actuator receiving part 32 of the first member 12. In this way, the adapter 100 can be connected to the actuator receiving part 32 of the first member 12. In other words, the thread 143" of the actuator 18B" can be screwed into the thread 41 of the fastening portion 40 of the first member 12. When using the adapter 100, the length of the coupling rod 50 needs to be extended. This can be easily accomplished by adding a rod extension that is configured to be frictionally received in the hollow interior of the coupling rod 50.

Additionally, additional adapters can be provided for proper installation of the actuator 18A', 18A''', 18B', 18B", 18B''', 18C', 18C" and 18C''' to the actuator receiving part 32. Of course, each these additional adapters includes an actuator receiving part configured to mate with the additional fastening portion of the actuator, and a connecting portion configured to mate with the fastening portion of the fastening portion 40 of the first member 12.

Figure 31:
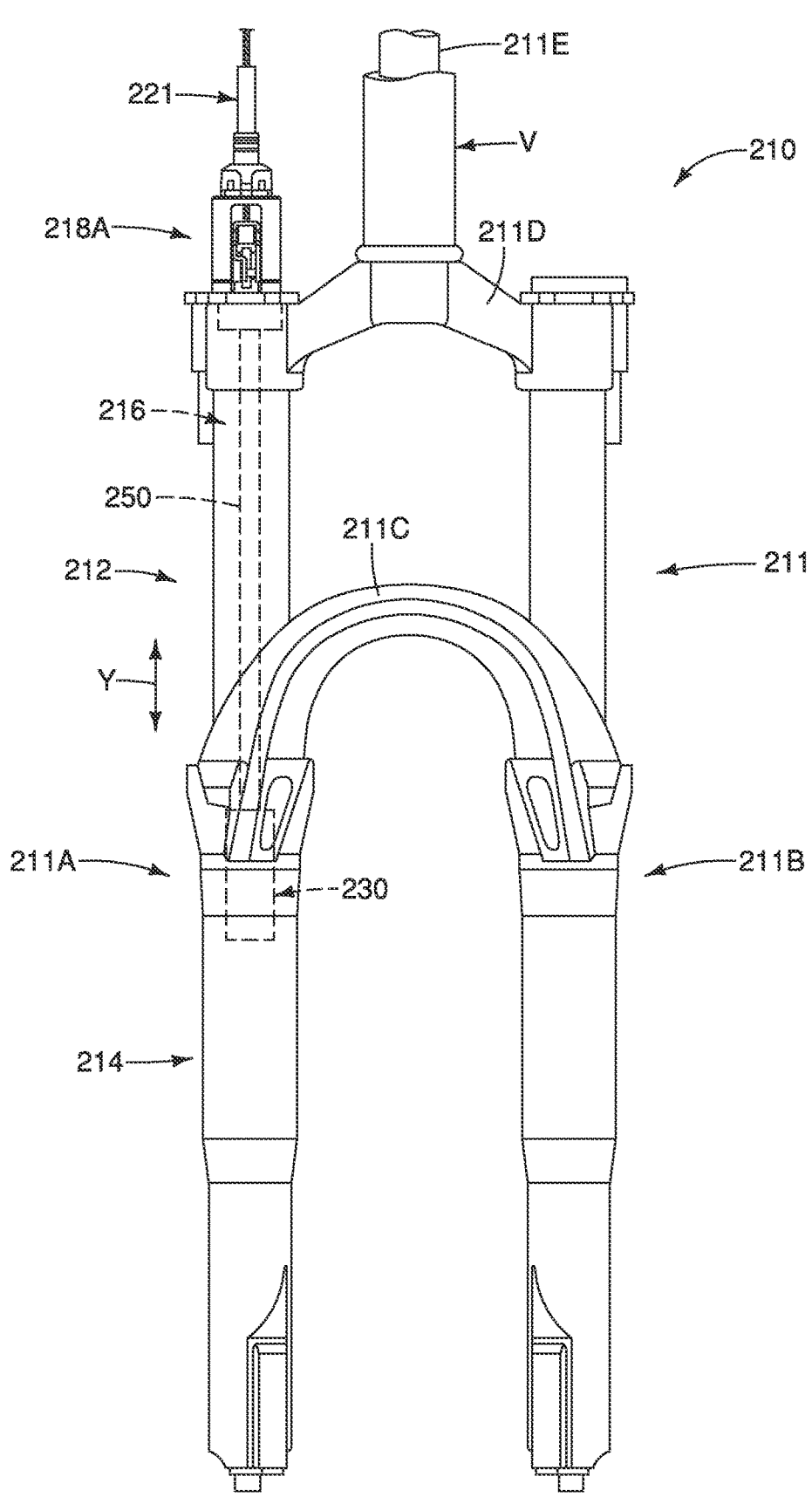
FIG. 31 is a front elevational view of a rider-posture changing assembly in accordance with a second embodiment in which the rider-posture changing assembly includes an adjustable suspension having a mechanical actuator.
Figure 32:
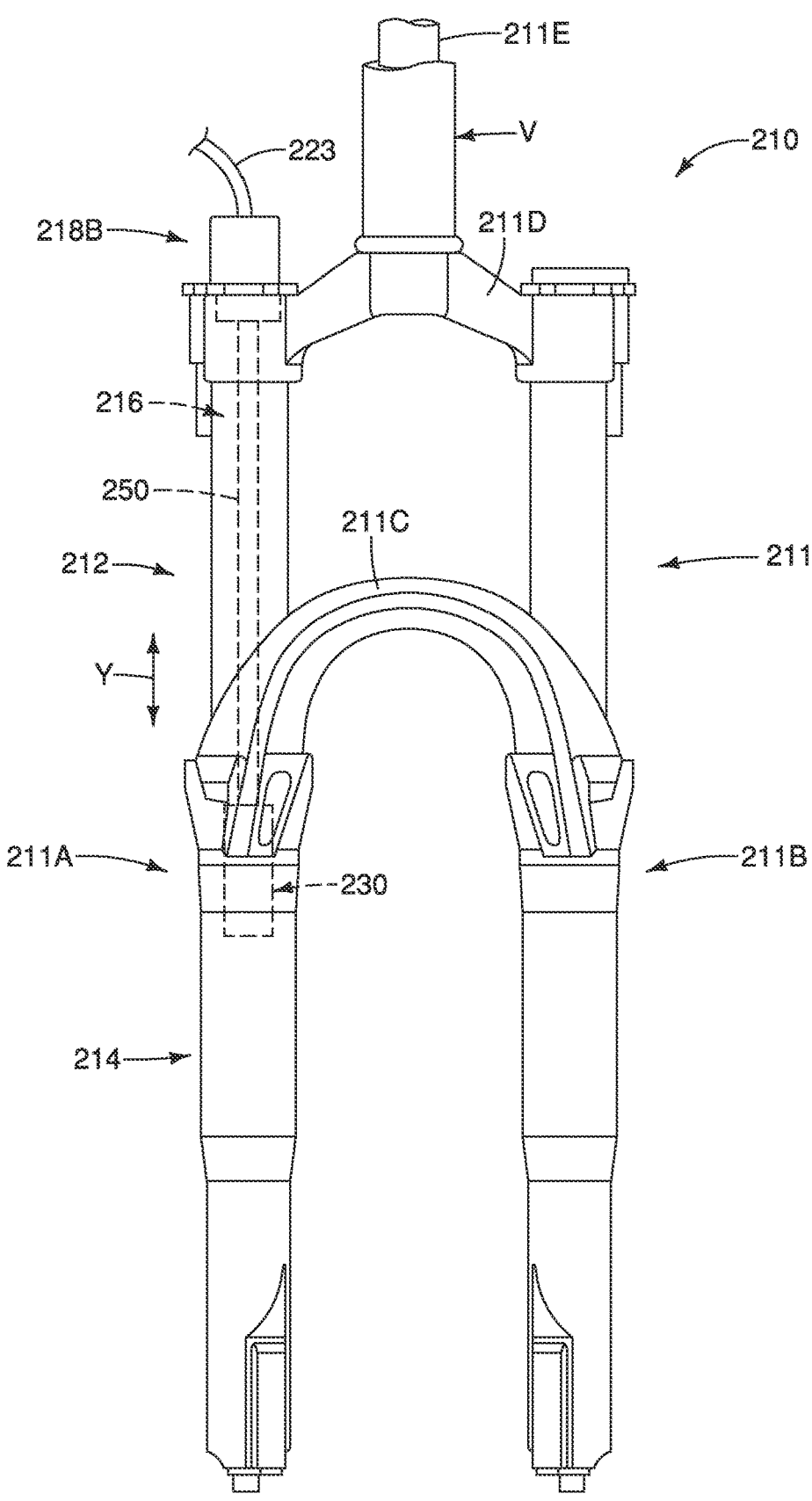
FIG. 32 is a front elevational view of a rider-posture changing assembly in accordance with the second embodiment of FIG. 31 in which the adjustable suspension has an electric actuator.

Referring now FIGS. 31 and 32, a rider-posture changing assembly 210 is illustrated in accordance with a second embodiment. The rider-posture changing assembly 210 can be used with the human-powered vehicle V (e.g., a bicycle) that is shown in FIG. 1. The rider-posture changing assembly 210 has the same basic structure and/or configuration as those of the rider-posture changing assembly 10, except that the posture changing assembly 210 has been adapted to an adjustable suspension 211. Here, the adjustable suspension 211 is a front suspension having a first shock absorber 211A and a second shock absorber 211B, a brace 211C, a crown 211D and a steerer column or steerer tube 211E. The brace 211C interconnects the lower sliders of the first shock absorber 211A and the second shock absorber 211B. The crown 211D interconnects the stanchions of the first shock absorber 211A and the second shock absorber 211B.

The first shock absorber 211A of the adjustable suspension 211 includes a first member 212 and a second member 214. The first member 212 corresponds to a first stanchion of the first shock absorber 211A. The second member 214 corresponds to a first slider of the first shock absorber 211A. The first member 212 and the second member 214 are relatively movable in a longitudinal direction Y. Basically, the first member 212 is a first tube extending in the longitudinal direction Y, and the second member 214 is a second tube extending in the longitudinal direction Y. Here, the first member 212 is an inner tube and the second member 214 is an outer tube. In general, the first member 212 is telescopically coupled to the second member 214 to absorb inputs to the front wheel FW.

Here, the rider-posture changing assembly 210 further comprises an actuator that can be either a mechanical actuator 218A or an electric actuator 218B. The mechanical actuator 218A is identical to the mechanical actuator 18A of the first embodiment. Also, the electric actuator 218B is identical to the electric actuator 18B of the first embodiment. The mechanical actuator 218A and the electric actuator 218B are each configured to be selectively attached to the first member 212 similar to the first embodiment. In other words, the mechanical actuator 218A and the electric actuator 218B are configured to be selectively interchangeable with respect to the first member 212. In this way, a user can selectively install either the mechanical actuator 218A or the electric actuator 218B as needed and/or desired.

The mechanical actuator 218A is configured to mechanically receive a control signal from an operating device via a control cable 221 similar to the first embodiment. The electric actuator 218B is configured to electrically receive a control signal from an operating device via an electrical cable 223 similar to the first embodiment. For example, the electrical cable 223 is a power cable that is used to carry out power line communication (PLC). In this case, the operating device coupled to the electric actuator 218B includes a communicator that is to carry out the power line communication (PLC). Alternatively, the actuator of the rider-posture changing assembly 210 can be an electric actuator that is configured to wirelessly receive a control signal from an operating device via a wireless communicator similar to the electric actuator 18C of the first embodiment.

The adjustable suspension 211 further includes a state-changing structure 230. The state-changing structure 230 is operatively couple to the actuator (e.g., the mechanical actuator 218A or the electric actuator 218B) that is connected to the first member 212. The state changing structure 230 is configured to change a state of the rider-posture changing assembly 210. For example, the state changing structure 230 is configured to change damper property, a stroke, or a locked state of the rider-posture changing assembly 210. Here, the state-changing structure 230 is operatively couple to the actuator (e.g., the mechanical actuator 218A or the electric actuator 218B) via a coupling rod 250 similar to the first embodiment.

In the present embodiment, for example, the state changing structure 230 is configured to change the state of the rider-posture changing assembly 210 between a first state where the first member 212 and the second member 214 are restricted from moving relative to each other and a second state where the first member 212 and the second member 214 are relatively movable in the longitudinal direction Y. The first state can also be referred to as a locked state. The second state can also be referred to as a usage state. However, the state changing structure 230 can be configured to change the state of the rider-posture changing assembly 210 between a low damping rate and a high damping rate. The state changing structure 230 can be configured to change the state of the rider-posture changing assembly 210 between a shorter stroke and a longer stroke.

Figures 33, 34:
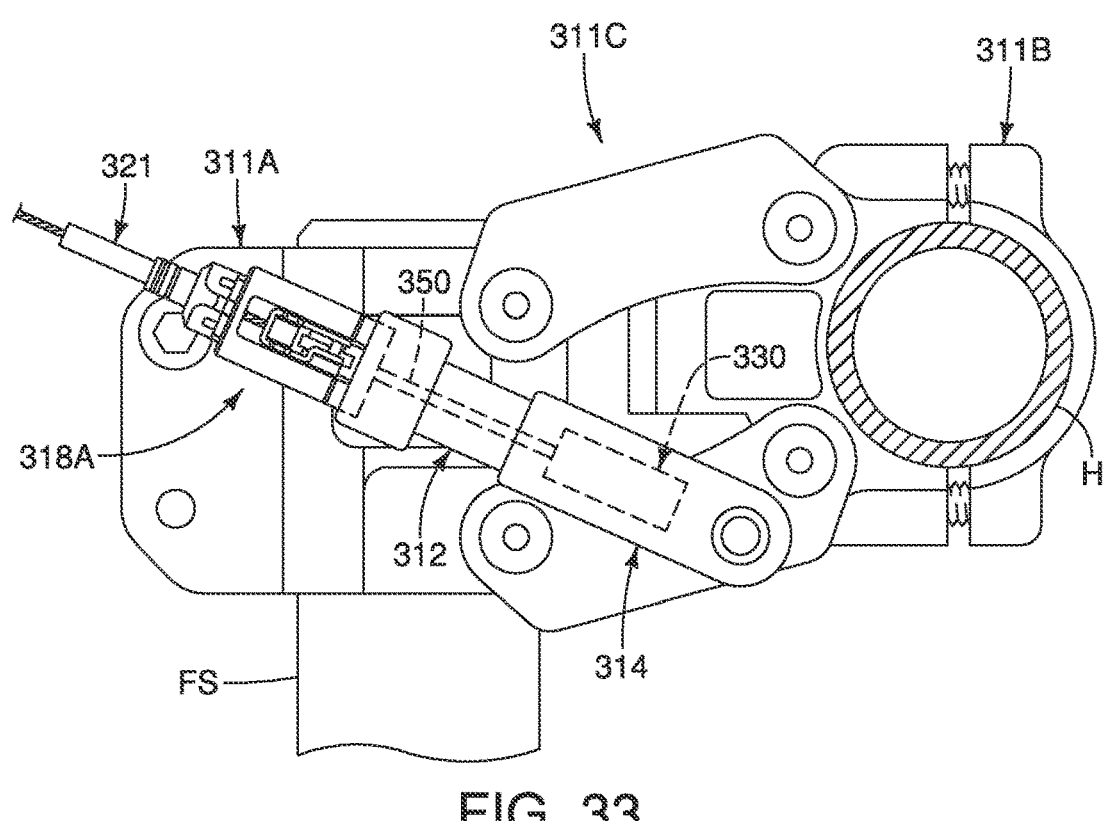
FIG. 33 is a side elevational view of a rider-posture changing assembly in accordance with a third embodiment in which the rider-posture changing assembly includes an adjustable handlebar stem having a mechanical actuator.
FIG. 34 is a side elevational view of a rider-posture changing assembly in accordance with a third embodiment in which the adjustable handlebar stem has an electric actuator.

Referring now FIGS. 33 and 34, a rider-posture changing assembly 310 is illustrated in accordance with a third embodiment. The rider-posture changing assembly 310 can be used with the human-powered vehicle V (e.g., a bicycle) that is shown in FIG. 1. The rider-posture changing assembly 310 has the same basic structure and/or configuration as those of the rider-posture changing assembly 10, except that the posture changing assembly 310 has been adapted to an adjustable handlebar stem 311. The adjustable handlebar stem 311 is coupled between the handlebar H relative to a steerer tube of the front suspension FS of FIG. 1. Basically, the adjustable handlebar stem 311 includes a first coupling member 311A, a second coupling member 311B and a linkage 311C. The first coupling member 311A is configured to be coupled to the steerer tube. In the case where the human-powered vehicle V is a bicycle, the first coupling member 311A constitutes a steerer tube mount. The second coupling member 311B is configured to be coupled to the handlebar H. In the case where the human-powered vehicle V is a bicycle, the second coupling member 311B constitutes a handlebar mount. In this way, the adjustable handlebar stem 311 is rigidly mounted to the steerer tube of the front suspension fork FF and supports the handlebar H for turning the front wheel FW with respect to the front frame body FB. The linkage 311C couples the second coupling member 311B to the first coupling member 311A. In this way, the second coupling member 311B is movable with respect to the first coupling member 311A.

Here, the adjustable handlebar stem 311 of the rider-posture changing assembly 310 further includes a first member 312 and a second member 314. The first member 312 is coupled to the first coupling member 311A. The second member 314 is coupled to the second coupling member 311B. The first member 312 and the second member 314 are relatively movable in a longitudinal direction Z. Basically, the first member 312 is a first tube extending in the longitudinal direction Z, and the second member 314 is a second tube extending in the longitudinal direction Z. Here, the first member 312 is an inner tube and the second member 314 is an outer tube. In general, the first member 312 is telescopically coupled to the second member 314 to change a position of the handlebar H relative to the front frame body FB.

Here, the rider-posture changing assembly 310 further comprises an actuator that can be either a mechanical actuator 318A or an electric actuator 318B. The mechanical actuator 318A is identical to the mechanical actuator 18A of the first embodiment, except that the mechanical actuator 318A has been reduced in size as compared to the mechanical actuator 18A. Also, the electric actuator 318B is identical to the electric actuator 18B of the first embodiment, except that the electric actuator 318B has been reduced in size as compared to the electric actuator 18B. The mechanical actuator 318A and the electric actuator 318B are each configured to be selectively attached to the first member 312 similar to the first embodiment. In other words, the mechanical actuator 318A and the electric actuator 318B are configured to be selectively interchangeable with respect to the first member 312. In this way, a user can selectively install either the mechanical actuator 318A or the electric actuator 318B as needed and/or desired. The mechanical actuator 318A and the electric actuator 318B are configured to move the second coupling member 311B relative to the first coupling member 311A for raising and lowering the handlebar H.

The mechanical actuator 318A is configured to mechanically receive a control signal from an operating device via a control cable 321 similar to the first embodiment. The electric actuator 318B is configured to electrically receive a control signal from an operating device via an electrical cable 323 similar to the first embodiment. For example, the electrical cable 323 is a power cable that is used to carry out power line communication (PLC). In this case, the operating device coupled to the electric actuator 318B includes a communicator that is to carry out the power line communication (PLC). Alternatively, the actuator of the rider-posture changing assembly 310 can be an electric actuator that is configured to wirelessly receive a control signal from an operating device via a wireless communicator similar to the electric actuator 18C of the first embodiment.

The adjustable handlebar stem 311 of the rider-posture changing assembly 310 further includes a state-changing structure 330. The state-changing structure 330 is operatively couple to the actuator (e.g., the mechanical actuator 318A or the electric actuator 318B) that is connected to the first member 312. The state changing structure 330 is configured to change a state of the rider-posture changing assembly 310. In particular, the state changing structure 330 is configured to change the height of the second coupling member 311B relative to the first coupling member 311A, and thus, the height of the handlebar H. Here, the state-changing structure 330 is operatively couple to the actuator (e.g., the mechanical actuator 318A or the electric actuator 318B) via a coupling rod 350 similar to the first embodiment.

In the present embodiment, for example, the state changing structure 330 is configured to change the state of the rider-posture changing assembly 310 between a first state and a second state. In the first state, the first member 312 and the second member 314 are retracted to establish a low position of the handlebar H. The first state can also be referred to as a low or retracted state. In the first state, the first member 312 and the second member 314 are extended to establish a top position of the handlebar H. The second state can also be referred to as a top or extended state.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright riding position and on the basis of the rider sitting on a saddle or seat of the human-powered vehicle V while facing a steering device or handlebar. Accordingly, these terms, as utilized to describe the rider-posture changing assembly 10, should be interpreted relative to the human-powered vehicle V equipped with the rider-posture changing assembly 10 as used in an upright riding position on a horizontal surface. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C. (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rider-posture changing assembly for a human-powered vehicle, the rider-posture changing assembly comprising:
   a first member extending in a longitudinal direction having a first distal end and a first proximal end opposite to the first distal end, the first proximal end having an actuator receiving part configured to receive one of a mechanical actuator and an electric actuator at a time, the mechanical actuator having a first connecting portion configured to engage with the actuator receiving part, the electric actuator having a second connecting portion configured to engage with the actuator receiving part, the second connecting portion is similar to the first connecting portion;
   a second member extending in the longitudinal direction, the first member and the second member being relatively movable in the longitudinal direction; and
   a state-changing structure operatively coupled to one of the mechanical actuator and the electric actuator, the state-changing structure being configured to change the state of the rider-posture changing assembly between a first state and a second state, the first member and the second member being restricted from moving relative to each other in the first state, the first member and the second member being relatively movable in the longitudinal direction in the second state.

2. A rider-posture changing assembly for a human-powered vehicle, the rider-posture changing assembly comprising:
   a first member extending in a longitudinal direction having a first distal end and a first proximal end opposite to the first distal end;
   a second member extending in the longitudinal direction, the first member and the second member being relatively movable in the longitudinal direction;
   an actuator configured to move one of the first member and the second member relative to another of the first member and the second member, the actuator being configured to be one of a mechanical actuator and an electric actuator; and
   a state-changing structure operatively connected to one of the mechanical actuator and the electric actuator, the state-changing structure being configured to change the state of the rider-posture changing assembly between a first state and a second state, the first member and the second member being restricted from moving relative to each other in the first state, the first member and the second member being relatively movable in the longitudinal direction in the second state,
   the state-changing structure being operated mechanically in a first coupling state where the mechanical actuator is coupled to the state-changing structure, the state-changing structure being operated electrically in a second coupling state where the electric actuator is coupled to the state-changing structure.

3. The rider-posture changing assembly according to claim 1, wherein the state-changing structure includes at least one of a compressible fluid, an incompressible fluid and a plurality of chambers, the state-changing structure is configured to vary volume of the at least one of the compressible fluid and the incompressible fluid in the plurality of chambers in the second state.

4. The rider-posture changing assembly according to claim 1, wherein the actuator is operatively coupled to a coupling rod, the coupling rod is configured to be moved in a movement direction relative to the one of the first member and the second member in the second state.

5. The rider-posture changing assembly according to claim 1, wherein the first proximal end includes a fastening portion provided to the actuator receiving part so as to configured to engage the actuator.

6. The rider-posture changing assembly according to claim 5, wherein the fastening portion is configured to engage one of the first and second connecting portions of the actuator.

7. The rider-posture changing assembly according to claim 6, wherein the fastening portion includes at least one of a thread, a magnetic portion, a recess, a ridge, a tab and a slot.

8. The rider-posture changing assembly according to claim 6, wherein one of the first and second connecting portions of the actuator includes an additional fastening portion configured to engage the fastening portion of the actuator receiving part.

9. The rider-posture changing assembly according to claim 8, wherein the additional fastening portion includes at least one of a thread, a magnetic portion, a recess, a ridge, a tab and a slot.

10. The rider-posture changing assembly according to claim 1, wherein the actuator includes an adapter provided with one of the first and second connecting portions, the adapter configured to provide proper installation of the actuator to the actuator receiving part.

11. The rider-posture changing assembly according to claim 10, wherein the adapter is a separate member from the actuator and detachably attachable to the actuator.

12. The rider-posture changing assembly according to claim 1, wherein the mechanical actuator includes an input member configured to receive an operating force to move in a first direction, and an output member coupled to the input member to move in a second direction opposite to the first movement direction in accordance with a movement of the input member, the output member is configured to actuate the state-changing structure in the second state.

13. The rider-posture changing assembly according to claim 12, wherein the input member is operatively coupled to an operating device, the input member is configured to receive the operating force in accordance with an operating amount of the operating device.

14. The rider-posture changing assembly according to claim 13, wherein the operating device includes one of a cable operating device and a hydraulic operating device.

15. The rider-posture changing assembly according to claim 1, wherein the electric actuator includes a controller configured to control an actuating device configured to actuate the state-changing structure in accordance with an electrical signal from an operating device.

16. The rider-posture changing assembly according to claim 15, wherein the actuating device includes at least one of a motor and a solenoid.

17. The rider-posture changing assembly according to claim 15, wherein the operating device is provided with a wireless communicator to wirelessly send the electrical signal to the electric actuator.

18. The rider-posture changing assembly according to claim 15, wherein the electric actuator is electrically connected to a power-supply, the power supply is provided to at least one of the first member, the second member, the electric actuator and a remote device.

19. The rider-posture changing assembly according to claim 18, wherein the power supply includes at least one of a rechargeable power-supply and a non-rechargeable power-supply.

20. The rider-posture changing assembly according to claim 1, further comprising a detector provided to at least one of the first member, the second member and the actuator, the detector being configured to detect position information of the second member relative to the first member, the detected position information being configured to be outputted as a signal to a remote device.

21. The rider-posture changing assembly according to claim 20, wherein the detector includes at least one of a contact position detector and a non-contact position detector.

* * * * *